US009597587B2

(12) United States Patent
Bathiche

(10) Patent No.: US 9,597,587 B2
(45) Date of Patent: Mar. 21, 2017

(54) LOCATIONAL NODE DEVICE

(75) Inventor: Steven Bathiche, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 13/155,422

(22) Filed: Jun. 8, 2011

(65) Prior Publication Data

US 2012/0315965 A1 Dec. 13, 2012

(51) Int. Cl.
*A63F 9/24* (2006.01)
*A63F 13/213* (2014.01)
(Continued)

(52) U.S. Cl.
CPC ........ *A63F 13/213* (2014.09); *A63F 3/00529* (2013.01); *A63F 3/00643* (2013.01); *A63F 13/10* (2013.01); *A63F 13/31* (2014.09); *A63F 2003/00646* (2013.01); *A63F 2009/2402* (2013.01); *A63F 2009/246* (2013.01); (Continued)

(58) Field of Classification Search
CPC .... G01B 11/14; G01B 11/24; H04N 13/0253; A63F 13/06; A63F 13/10; A63F 3/00529; A63F 3/00643; A63F 2300/1018; A63F 2300/1068; A63F 2300/1093; A63F 2300/6045; A63F 2003/00646; (Continued)

(56) References Cited

U.S. PATENT DOCUMENTS 1,402,608 A 9/1983 DiMatteo et al.
4,627,620 A 12/1986 Yang
(Continued)

FOREIGN PATENT DOCUMENTS

CN 1378741 11/2002
CN 101198964 A 6/2008
(Continued)

OTHER PUBLICATIONS

Cotting, D., Ziegler, R., Gross, M. And Fuchs, H. (2005), Adaptive Instant Displays: Continuously Calibrated Projections Using Per-Pixel Light Control. Computer Graphics Forum, 24: 705-714.*
(Continued)

*Primary Examiner* — Dmitry Suhol
*Assistant Examiner* — Carl V Larsen
(74) *Attorney, Agent, or Firm* — Rainier Patents, P.S.

(57) ABSTRACT

A node device in a distributed virtual environment captures locational signals projected by another node device into a capture area of the node device and reflected from the capture area to a capture device of the node device. The location of the node device relative to the other node device is determined based on the captured locational signals. The determined location can be based on an angular relationship determined between the node device and the other node device based on the captured locational signals. The determined location can also be based on a relative distance determined between the node device and the other node device based on the captured locational signals. Topology of the capture area can also be detected by the node device, and topologies of multiple capture areas can be combined to define one or more surfaces in a virtual environment.

20 Claims, 10 Drawing Sheets

(51) Int. Cl.
*A63F 13/31* (2014.01)
*A63F 3/00* (2006.01)
*A63F 13/40* (2014.01)
*H04N 13/02* (2006.01)

(52) U.S. Cl.
CPC .......... *A63F 2009/2438* (2013.01); *A63F 2009/2452* (2013.01); *A63F 2009/2461* (2013.01); *A63F 2009/2486* (2013.01); *A63F 2009/2492* (2013.01); *A63F 2250/18* (2013.01); *A63F 2300/1018* (2013.01); *A63F 2300/1068* (2013.01); *A63F 2300/1093* (2013.01); *A63F 2300/6045* (2013.01); *H04N 13/0253* (2013.01)

(58) Field of Classification Search
CPC ...... A63F 2009/2452; A63F 2009/2402; A63F 2250/18
USPC .................................. 348/135, 136; 463/34
See application file for complete search history.

(56) References Cited

U.S. PATENT DOCUMENTS

| | | | |
|---|---|---|---|
| 4,630,910 A | 12/1986 | Ross et al. | |
| 4,645,458 A | 2/1987 | Williams | |
| 4,695,953 A | 9/1987 | Blair et al. | |
| 4,702,475 A | 10/1987 | Elstein et al. | |
| 4,711,543 A | 12/1987 | Blair et al. | |
| 4,751,642 A | 6/1988 | Silva et al. | |
| 4,786,966 A | 11/1988 | Hanson et al. | |
| 4,796,997 A | 1/1989 | Svetkoff et al. | |
| 4,809,065 A | 2/1989 | Harris et al. | |
| 4,817,950 A | 4/1989 | Goo | |
| 4,843,568 A | 6/1989 | Krueger et al. | |
| 4,893,183 A | 1/1990 | Nayar | |
| 4,901,362 A | 2/1990 | Terzian | |
| 4,925,189 A | 5/1990 | Braeunig | |
| 5,101,444 A | 3/1992 | Wilson et al. | |
| 5,148,154 A | 9/1992 | MacKay et al. | |
| 5,184,295 A | 2/1993 | Mann | |
| 5,229,754 A | 7/1993 | Aoki et al. | |
| 5,229,756 A | 7/1993 | Kosugi et al. | |
| 5,239,463 A | 8/1993 | Blair et al. | |
| 5,239,464 A | 8/1993 | Blair et al. | |
| 5,288,078 A | 2/1994 | Capper et al. | |
| 5,295,491 A | 3/1994 | Gevins | |
| 5,320,538 A | 6/1994 | Baum | |
| 5,347,306 A | 9/1994 | Nitta | |
| 5,385,519 A | 1/1995 | Hsu et al. | |
| 5,405,152 A | 4/1995 | Katanics et al. | |
| 5,417,210 A | 5/1995 | Funda et al. | |
| 5,423,554 A | 6/1995 | Davis | |
| 5,454,043 A | 9/1995 | Freeman | |
| 5,469,740 A | 11/1995 | French et al. | |
| 5,495,576 A | 2/1996 | Ritchey | |
| 5,511,148 A | 4/1996 | Wellner | |
| 5,516,105 A | 5/1996 | Eisenbrey et al. | |
| 5,524,637 A | 6/1996 | Erickson et al. | |
| 5,534,917 A | 7/1996 | MacDougall | |
| 5,552,839 A | 9/1996 | Kuhl | |
| 5,563,988 A | 10/1996 | Maes et al. | |
| 5,577,981 A | 11/1996 | Jarvik | |
| 5,580,249 A | 12/1996 | Jacobsen et al. | |
| 5,594,469 A | 1/1997 | Freeman et al. | |
| 5,597,309 A | 1/1997 | Riess | |
| 5,616,078 A | 4/1997 | Oh | |
| 5,617,312 A | 4/1997 | Iura et al. | |
| 5,638,300 A | 6/1997 | Johnson | |
| 5,641,288 A | 6/1997 | Zaenglein | |
| 5,682,196 A | 10/1997 | Freeman | |
| 5,682,229 A | 10/1997 | Wangler | |
| 5,690,582 A | 11/1997 | Ulrich et al. | |
| 5,703,367 A | 12/1997 | Hashimoto et al. | |
| 5,704,837 A | 1/1998 | Iwasaki et al. | |
| 5,714,997 A | 2/1998 | Anderson | |
| 5,715,834 A | 2/1998 | Bergamasco et al. | |
| 5,870,136 A * | 2/1999 | Fuchs et al. | ................. 348/42 |
| 5,875,108 A | 2/1999 | Hoffberg et al. | |
| 5,877,803 A | 3/1999 | Wee et al. | |
| 5,913,727 A | 6/1999 | Ahdoot | |
| 5,933,125 A | 8/1999 | Fernie | |
| 5,980,256 A | 11/1999 | Carmein | |
| 5,989,157 A | 11/1999 | Walton | |
| 5,995,649 A | 11/1999 | Marugame | |
| 6,005,548 A | 12/1999 | Latypov et al. | |
| 6,009,210 A | 12/1999 | Kang | |
| 6,009,359 A | 12/1999 | El-Hakim et al. | |
| 6,054,991 A | 4/2000 | Crane et al. | |
| 6,066,075 A | 5/2000 | Poulton | |
| 6,072,494 A | 6/2000 | Nguyen | |
| 6,073,489 A | 6/2000 | French et al. | |
| 6,077,201 A | 6/2000 | Cheng et al. | |
| 6,098,458 A | 8/2000 | French et al. | |
| 6,100,896 A | 8/2000 | Strohecker et al. | |
| 6,101,289 A | 8/2000 | Kellner | |
| 6,128,003 A | 10/2000 | Smith et al. | |
| 6,130,677 A | 10/2000 | Kunz | |
| 6,141,463 A | 10/2000 | Covell et al. | |
| 6,147,678 A | 11/2000 | Kumar et al. | |
| 6,152,856 A | 11/2000 | Studor et al. | |
| 6,159,100 A | 12/2000 | Smith | |
| 6,173,066 B1 | 1/2001 | Peurach et al. | |
| 6,181,343 B1 | 1/2001 | Lyons | |
| 6,188,777 B1 | 2/2001 | Darrell et al. | |
| 6,215,890 B1 | 4/2001 | Matsuo et al. | |
| 6,215,898 B1 | 4/2001 | Woodfill et al. | |
| 6,226,396 B1 | 5/2001 | Marugame | |
| 6,229,913 B1 | 5/2001 | Nayar et al. | |
| 6,252,579 B1 | 6/2001 | Rosenberg et al. | |
| 6,256,033 B1 | 7/2001 | Nguyen | |
| 6,256,400 B1 | 7/2001 | Takata et al. | |
| 6,283,860 B1 | 9/2001 | Lyons et al. | |
| 6,289,112 B1 | 9/2001 | Jain et al. | |
| 6,299,308 B1 | 10/2001 | Voronka et al. | |
| 6,308,565 B1 | 10/2001 | French et al. | |
| 6,316,934 B1 | 11/2001 | Amorai-Moriya et al. | |
| 6,363,160 B1 | 3/2002 | Bradski et al. | |
| 6,369,805 B1 | 4/2002 | Kuzunuki et al. | |
| 6,384,819 B1 | 5/2002 | Hunter | |
| 6,411,744 B1 | 6/2002 | Edwards | |
| 6,430,997 B1 | 8/2002 | French et al. | |
| 6,431,711 B1 | 8/2002 | Pinhanez | |
| 6,476,834 B1 | 11/2002 | Doval et al. | |
| 6,496,598 B1 | 12/2002 | Harman | |
| 6,503,195 B1 | 1/2003 | Keller et al. | |
| 6,539,931 B2 | 4/2003 | Trajkovic et al. | |
| 6,542,154 B1 | 4/2003 | Knittel et al. | |
| 6,570,555 B1 | 5/2003 | Prevost et al. | |
| 6,570,566 B1 | 5/2003 | Yoshigahara | |
| 6,633,294 B1 | 10/2003 | Rosenthal et al. | |
| 6,640,202 B1 | 10/2003 | Dietz et al. | |
| 6,661,918 B1 | 12/2003 | Gordon et al. | |
| 6,681,031 B2 | 1/2004 | Cohen et al. | |
| 6,714,665 B1 | 3/2004 | Hanna et al. | |
| 6,731,799 B1 | 5/2004 | Sun et al. | |
| 6,738,066 B1 | 5/2004 | Nguyen | |
| 6,765,726 B2 | 7/2004 | French et al. | |
| 6,788,809 B1 | 9/2004 | Grzeszczuk et al. | |
| 6,801,637 B2 | 10/2004 | Voronka et al. | |
| 6,873,723 B1 | 3/2005 | Aucsmith et al. | |
| 6,876,496 B2 | 4/2005 | French et al. | |
| 6,937,742 B2 | 8/2005 | Roberts et al. | |
| 6,950,534 B2 | 9/2005 | Cohen et al. | |
| 7,003,134 B1 | 2/2006 | Covell et al. | |
| 7,027,040 B2 | 4/2006 | Rekimoto et al. | |
| 7,027,659 B1 | 4/2006 | Thomas | |
| 7,036,094 B1 | 4/2006 | Cohen et al. | |
| 7,038,855 B2 | 5/2006 | French et al. | |
| 7,039,676 B1 | 5/2006 | Day et al. | |
| 7,042,440 B2 | 5/2006 | Pryor et al. | |
| 7,050,606 B2 | 5/2006 | Paul et al. | |
| 7,058,204 B2 | 6/2006 | Hildreth et al. | |
| 7,060,957 B2 | 6/2006 | Lange et al. | |

(56) References Cited

U.S. PATENT DOCUMENTS

| | | |
|---|---|---|
| 7,069,516 B2 | 6/2006 | Rekimoto |
| 7,071,897 B2 | 7/2006 | Bronson |
| 7,113,918 B1 | 9/2006 | Ahmad et al. |
| 7,121,946 B2 | 10/2006 | Paul et al. |
| 7,164,789 B2 * | 1/2007 | Chen et al. ............ 382/154 |
| 7,170,492 B2 | 1/2007 | Bell |
| 7,182,465 B2 | 2/2007 | Fuchs et al. |
| 7,184,048 B2 | 2/2007 | Hunter |
| 7,199,793 B2 | 4/2007 | Oh et al. |
| 7,202,898 B1 | 4/2007 | Braun et al. |
| 7,204,428 B2 | 4/2007 | Wilson |
| 7,222,078 B2 | 5/2007 | Abelow |
| 7,227,526 B2 | 6/2007 | Hildreth et al. |
| 7,242,818 B2 * | 7/2007 | Beardsley et al. ............ 382/291 |
| 7,259,747 B2 | 8/2007 | Bell |
| 7,260,474 B1 | 8/2007 | Thayathil et al. |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,047 B2 | 5/2008 | Drucker et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,394,459 B2 | 7/2008 | Bathiche et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,479,967 B2 | 1/2009 | Bachelder et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,599,561 B2 | 10/2009 | Wilson et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |
| 7,747,067 B2 | 6/2010 | Popescu et al. |
| 7,760,182 B2 | 7/2010 | Ahmad et al. |
| 7,809,167 B2 | 10/2010 | Bell |
| 7,812,815 B2 | 10/2010 | Banerjee et al. |
| 7,834,846 B1 | 11/2010 | Bell |
| 7,843,449 B2 | 11/2010 | Krah |
| 7,852,262 B2 | 12/2010 | Namineni et al. |
| RE42,256 E | 3/2011 | Edwards |
| 7,898,522 B2 | 3/2011 | Hildreth et al. |
| 7,942,530 B2 * | 5/2011 | Majumder et al. ............ 353/30 |
| 8,035,612 B2 | 10/2011 | Bell et al. |
| 8,035,614 B2 | 10/2011 | Bell et al. |
| 8,035,624 B2 | 10/2011 | Bell et al. |
| 8,068,095 B2 | 11/2011 | Pryor |
| 8,072,470 B2 | 12/2011 | Marks |
| 8,130,330 B2 | 3/2012 | Tan et al. |
| 8,427,424 B2 | 4/2013 | Hartmann et al. |
| 8,570,320 B2 | 10/2013 | Izadi et al. |
| 8,570,423 B2 | 10/2013 | Robinson et al. |
| 8,730,309 B2 | 5/2014 | Wilson et al. |
| 8,965,460 B1 | 2/2015 | Rao et al. |
| 9,137,511 B1 | 9/2015 | Legrand, III et al. |
| 2001/0035845 A1 | 11/2001 | Zwern |
| 2001/0044858 A1 | 11/2001 | Rekimoto |
| 2001/0048429 A1 | 12/2001 | Liao et al. |
| 2002/0158873 A1 | 10/2002 | Williamson |
| 2003/0020707 A1 | 1/2003 | Kangas et al. |
| 2003/0034976 A1 | 2/2003 | Raskar et al. |
| 2003/0042401 A1 | 3/2003 | Gartner et al. |
| 2003/0071784 A1 | 4/2003 | Sato et al. |
| 2003/0227470 A1 | 12/2003 | Genc et al. |
| 2004/0037450 A1 | 2/2004 | Bradski |
| 2004/0046711 A1 | 3/2004 | Triebfuerst |
| 2004/0046736 A1 | 3/2004 | Pryor et al. |
| 2004/0102247 A1 | 5/2004 | Smoot |
| 2004/0125044 A1 | 7/2004 | Suzuki |
| 2004/0196282 A1 | 10/2004 | Oh |
| 2004/0257540 A1 | 12/2004 | Roy et al. |
| 2005/0135670 A1 | 6/2005 | Vaidyanathan |
| 2005/0185150 A1 | 8/2005 | Turner et al. |
| 2005/0254726 A1 | 11/2005 | Fuchs et al. |
| 2006/0001645 A1 | 1/2006 | Drucker et al. |
| 2006/0001650 A1 | 1/2006 | Robbins et al. |
| 2006/0036944 A1 | 2/2006 | Wilson |
| 2006/0109239 A1 | 5/2006 | Hsiung |
| 2006/0158452 A1 | 7/2006 | Borger et al. |
| 2006/0268363 A1 | 11/2006 | Meinders |
| 2006/0294247 A1 | 12/2006 | Hinckley et al. |
| 2007/0013716 A1 | 1/2007 | Kjeldsen et al. |
| 2007/0055782 A1 | 3/2007 | Wright et al. |
| 2007/0124370 A1 | 5/2007 | Nareddy et al. |
| 2007/0126864 A1 | 6/2007 | Bhat et al. |
| 2007/0126938 A1 | 6/2007 | Tan et al. |
| 2007/0132733 A1 | 6/2007 | Ram |
| 2007/0247422 A1 | 10/2007 | Vertegaal et al. |
| 2007/0285419 A1 | 12/2007 | Givon |
| 2007/0299338 A1 * | 12/2007 | Stevick et al. ............ 600/425 |
| 2008/0002262 A1 | 1/2008 | Chirieleison |
| 2008/0007567 A1 | 1/2008 | Clatworthy et al. |
| 2008/0024594 A1 | 1/2008 | Ritchey |
| 2008/0026838 A1 | 1/2008 | Dunstan et al. |
| 2008/0031327 A1 | 2/2008 | Wang et al. |
| 2008/0095468 A1 | 4/2008 | Klemmer et al. |
| 2008/0143969 A1 | 6/2008 | Aufranc et al. |
| 2008/0180402 A1 | 7/2008 | Yoo et al. |
| 2008/0199071 A1 | 8/2008 | Gu |
| 2008/0214233 A1 | 9/2008 | Wilson et al. |
| 2008/0229194 A1 | 9/2008 | Boler et al. |
| 2008/0231634 A1 | 9/2008 | Gyde et al. |
| 2008/0239109 A1 | 10/2008 | Jennings |
| 2008/0239250 A1 | 10/2008 | Jose |
| 2008/0246781 A1 | 10/2008 | Surati et al. |
| 2008/0263458 A1 | 10/2008 | Altberg et al. |
| 2008/0285843 A1 | 11/2008 | Lim |
| 2008/0316201 A1 | 12/2008 | Nayar et al. |
| 2009/0027330 A1 | 1/2009 | Aida |
| 2009/0037841 A1 | 2/2009 | Bell et al. |
| 2009/0046152 A1 | 2/2009 | Aman |
| 2009/0059041 A1 | 3/2009 | Kwon |
| 2009/0079942 A1 | 3/2009 | Lee et al. |
| 2009/0091581 A1 | 4/2009 | Lapa |
| 2009/0109280 A1 | 4/2009 | Gotsman et al. |
| 2009/0124379 A1 | 5/2009 | Wells |
| 2009/0128783 A1 | 5/2009 | Shih et al. |
| 2009/0143141 A1 | 6/2009 | Wells et al. |
| 2009/0149250 A1 | 6/2009 | Middleton |
| 2009/0167966 A1 | 7/2009 | Nam et al. |
| 2009/0215533 A1 | 8/2009 | Zalewski et al. |
| 2009/0217187 A1 | 8/2009 | Kendall et al. |
| 2009/0237564 A1 | 9/2009 | Kikinis et al. |
| 2009/0244309 A1 | 10/2009 | Maison et al. |
| 2009/0276734 A1 | 11/2009 | Taylor et al. |
| 2009/0315875 A1 | 12/2009 | Kuroki |
| 2010/0063681 A1 | 3/2010 | Correns et al. |
| 2010/0073366 A1 | 3/2010 | Tateno |
| 2010/0073476 A1 * | 3/2010 | Liang et al. ............ 348/136 |
| 2010/0103196 A1 | 4/2010 | Kumar et al. |

(56) References Cited

U.S. PATENT DOCUMENTS

| | | | |
|---|---|---|---|
| 2010/0103386 | A1 | 4/2010 | Kubota |
| 2010/0128112 | A1 | 5/2010 | Marti et al. |
| 2010/0164990 | A1* | 7/2010 | Van Doorn ............ 345/633 |
| 2010/0182416 | A1 | 7/2010 | Holmgren et al. |
| 2010/0194862 | A1 | 8/2010 | Givon |
| 2010/0194863 | A1 | 8/2010 | Lopes et al. |
| 2010/0194872 | A1 | 8/2010 | Mathe et al. |
| 2010/0199230 | A1 | 8/2010 | Latta et al. |
| 2010/0201878 | A1 | 8/2010 | Barenbrug et al. |
| 2010/0201894 | A1 | 8/2010 | Nakayama et al. |
| 2010/0225743 | A1 | 9/2010 | Florencio et al. |
| 2010/0281432 | A1 | 11/2010 | Geisner et al. |
| 2010/0315491 | A1 | 12/2010 | Carter et al. |
| 2010/0330843 | A1* | 12/2010 | Gao et al. .......... 439/620.21 |
| 2011/0018903 | A1 | 1/2011 | Lapstun et al. |
| 2011/0025689 | A1 | 2/2011 | Perez et al. |
| 2011/0058709 | A1 | 3/2011 | Kipman et al. |
| 2011/0107216 | A1 | 5/2011 | Bi |
| 2011/0205242 | A1 | 8/2011 | Friesen |
| 2011/0205341 | A1 | 8/2011 | Wilson et al. |
| 2011/0216948 | A1 | 9/2011 | Yalla et al. |
| 2011/0234481 | A1 | 9/2011 | Katz et al. |
| 2011/0263326 | A1 | 10/2011 | Gagner et al. |
| 2011/0304691 | A1 | 12/2011 | Newton et al. |
| 2011/0310226 | A1 | 12/2011 | McEldowney |
| 2011/0316845 | A1 | 12/2011 | Roberts et al. |
| 2012/0086624 | A1 | 4/2012 | Thompson et al. |
| 2012/0105585 | A1 | 5/2012 | Masalkar et al. |
| 2012/0113223 | A1 | 5/2012 | Hilliges et al. |
| 2012/0117514 | A1 | 5/2012 | Kim et al. |
| 2012/0140038 | A1 | 6/2012 | Bi et al. |
| 2012/0154277 | A1 | 6/2012 | Bar-Zeev et al. |
| 2012/0154619 | A1 | 6/2012 | Lee |
| 2012/0157204 | A1 | 6/2012 | Kelsey et al. |
| 2012/0162254 | A1 | 6/2012 | Anderson |
| 2012/0194516 | A1 | 8/2012 | Newcombe et al. |
| 2012/0194517 | A1 | 8/2012 | Izadi et al. |
| 2012/0212509 | A1 | 8/2012 | Benko et al. |
| 2012/0223885 | A1 | 9/2012 | Perez et al. |
| 2012/0223909 | A1 | 9/2012 | Tse et al. |
| 2012/0249741 | A1 | 10/2012 | Maciocci et al. |
| 2012/0264510 | A1 | 10/2012 | Wigdor et al. |
| 2012/0268570 | A1 | 10/2012 | Trumbull |
| 2012/0274745 | A1 | 11/2012 | Russell |
| 2012/0293548 | A1 | 11/2012 | Perez et al. |
| 2013/0002815 | A1 | 1/2013 | Smoot et al. |
| 2013/0069985 | A1 | 3/2013 | Wong et al. |
| 2013/0147686 | A1 | 6/2013 | Clavin et al. |
| 2013/0176539 | A1 | 7/2013 | Kilcher |
| 2013/0187835 | A1 | 7/2013 | Vaught et al. |
| 2013/0229353 | A1 | 9/2013 | Hartmann et al. |
| 2013/0266174 | A1 | 10/2013 | Bleiweiss et al. |
| 2013/0278631 | A1 | 10/2013 | Border et al. |
| 2013/0336629 | A1 | 12/2013 | Mulholland et al. |
| 2014/0049609 | A1 | 2/2014 | Wilson et al. |
| 2014/0051510 | A1 | 2/2014 | Benko et al. |
| 2014/0125785 | A1 | 5/2014 | Na et al. |
| 2014/0184496 | A1 | 7/2014 | Gribetz et al. |
| 2014/0247263 | A1 | 9/2014 | Wilson et al. |
| 2014/0253692 | A1 | 9/2014 | Wilson et al. |
| 2015/0049001 | A1 | 2/2015 | Rahman et al. |
| 2016/0371884 | A1 | 12/2016 | Benko et al. |

FOREIGN PATENT DOCUMENTS

| | | |
|---|---|---|
| CN | 201254344 Y | 6/2009 |
| EP | 0583061 A2 | 2/1994 |
| EP | 1067362 A1 | 1/2001 |
| EP | 1396781 A2 | 3/2004 |
| EP | 1600902 A | 11/2005 |
| EP | 2378310 A1 | 10/2011 |
| JP | 04-056993 A | 2/1992 |
| JP | 04328627 A | 11/1992 |
| JP | H07129319 A | 5/1995 |
| JP | 07168949 A | 7/1995 |
| JP | 08044490 A1 | 2/1996 |
| JP | 09046776 A | 2/1997 |
| JP | H11134327 A | 5/1999 |
| JP | 2000322367 A | 11/2000 |
| JP | 2001-175374 A | 6/2001 |
| JP | 2005-099064 A | 4/2005 |
| JP | 2005031747 | 10/2005 |
| JP | 2006148730 A | 6/2006 |
| JP | 2007-503146 | 2/2007 |
| JP | 2007226406 A | 9/2007 |
| JP | 2007-264633 | 10/2007 |
| JP | 2007299384 A | 11/2007 |
| JP | 2008-033844 A | 2/2008 |
| JP | 2008112077 A | 5/2008 |
| JP | 2009-031334 A | 2/2009 |
| JP | 2012510673 | 5/2012 |
| KR | 1020020040773 A | 5/2002 |
| KR | 100811015 B1 | 3/2008 |
| KR | 20120018915 A | 3/2012 |
| TW | I335009 B1 | 11/2009 |
| WO | 93/10708 A1 | 6/1993 |
| WO | 97/17598 A1 | 5/1997 |
| WO | 99/44698 A2 | 9/1999 |
| WO | 2005017739 A1 | 2/2005 |
| WO | 2006074310 A2 | 7/2006 |
| WO | 2006105686 A1 | 10/2006 |
| WO | 2007134456 A1 | 11/2007 |
| WO | 2009069958 A2 | 6/2009 |
| WO | 2009142015 A1 | 11/2009 |
| WO | 2010019802 A1 | 2/2010 |
| WO | 2011106201 A2 | 9/2011 |

OTHER PUBLICATIONS

El-Hakim, et al., "Sensor Based Creation of Indoor Virtual Environment Models", Retrieved at <<http://www.3dphotomodeling.org/vsmm97.pdf>>, Proceedings of the 1997 International Conference on Virtual Systems and MultiMedia, Sep. 10-12, 1997, pp. 9.

Hu, et al., "Sensors and Data Fusion Algorithms in Mobile Robotics", Retrieved at <<http://cswww.essex.ac.uk/staff/hhu/Papers/CSM-422.pdf>>, Research report CSM422 University of Essex, Jan. 10, 2005, pp. 1-12.

Boverie, et al., "Comparison of structured light and stereovision sensors for new airbag generations", Retrieved at <<http://homepages.laas.fr/lerasle/pdf/cep03.pdf>>, vol. 11, No. 12, Dec. 2003, pp. 1413-1421.

Leiva, et al., "3D reconstruction of a static indoor environment by fusion of sonar and video data", Retrieved at <<http://webpersonal.uma.es/~EPEREZ/files/SIRS01.pdf>>, Retrieved Date: Mar. 15, 2011, pp. 10.

Sequeira, et al., "3D Reconstruction of Indoor Environments", Retrieved at <<http://citeseerx.ist.psu.edu/viewdoc/download?doi=10.1.1.56.8118&rep=rep1&type=pdf>>, Proceedings of International Conference on Image Processing, vol. 02, Sepember 16-19, 1996, pp. 4.

El-Hakim, et al., "Two 3-D Sensors for Environment Modeling and Virtual Reality: Calibration and Multi-View Registration", Retrieved at <<http://citeseerx.ist.psu.edu/viewdoc/download?doi=10.1.1.50.5514&rep=rep1&type=pdf>>, Proceedings of International Archives on Photogrammetry and Remote Sensing, vol. 35, 1996, pp. 10.

Scheibe, et al., "Data Fusion and Visualization of Panoramic Images and Laser Scans", Retrieved at <<http://www.dlr.de/os/Portaldata/48/Resources/dokumente/projekte/pancam_laser.pdf>>, Retrieved Date: Mar. 15, 2011, pp. 8.

Tedesco, et al., "Integrated Virtual Environment", U.S. Appl. No. 13/084,786, filed Apr. 12, 2011, pp. 1-28.

Wilson, et al., "Providing an Interactive Experience Using a 3D Depth Camera and a 3D Projector", U.S. Appl. No. 13/074,041, filed Mar. 29, 2011, pp. 1-43.

Tang et al.; "Augmented Reality Systems for Medical Applications"; IEEE Engineering in Medicine and Biology Magazine; May-Jun. 1998; pp. 49-58.

(56) References Cited

OTHER PUBLICATIONS

Dodds, et al.; "A Communication Task in HMD Virtual Environments: Speaker and Listener Movement"; Proceedings of the 23$^{rd}$ Annual Conference on Computer Animation and Social Agents (CASA); 2010; 4 pages.
Buchenau, et al., "Experience Prototyping", Proceedings of the 3rd Conference on Designing Interactive Systems: Processes, Practices, Methods, and Techniques, 2000, 424-433.
Cook, et al., "Designers' Use of Paper and the Implications for Informal Tools", Proceedings of the 17th Australia Conference on Computer-Human Interaction: Citizens Online: Considerations for Today and the Future, 2005, pp. 1-10.
Cotting, et al., "Interactive Environment-Aware Display Bubbles", Proceedings of the 19th Annual ACM Symposium on User Interface Software and Technology, Oct. 15-18, 2006, pp. 245-254.
Coutaz, et al., "Coupling Interaction Resources: an Analytical Model", Proceedings of the 2005 Joint Conference on Smart Objects and Ambient Intelligence: Innovative Context-Aware services: Usages and Technologies, Oct. 2005, pp. 183-188.
Dias, et al., "Tangible Interaction for Conceptual Architectural Design", Retrieved at http://ieeexplore.ieee.org/stamp/ stamp.jsp?tp=&arnumber=1106951 , The First IEEE International Workshop on Augmented Reality Toolkit, 2002, pp. 1-9.
Dietz, et al., "DiamondTouch: a Multi-User Touch Technology", Mitsubishi Electric Research Laboratories, Report TR2003-125, Oct. 2003, 10 pages.
Forlines, et al., "Direct-touch vs. Mouse Input for Tabletop Displays", Proceedings of the SIGCHI Conference on Human Factors in Computing Systems, Apr. 28-May 3, 2007, pp. 647-656.
Guimbretiere, et al., "Fluid Interaction with High-Resolution Wall-Size Displays", Proceedings of the 14th Annual ACM Symposium on User Interface Software and Technology, 2001, pp. 21-30.
"International Search Report and Written Opinion for PCT Application No. PCT/US2009/054607", Filed Date: Aug. 21, 2009, Mailed Date Apr. 6, 2010, 11 pages.
"Non-Final Office Action for U.S. Appl. No. 13/084,786", Mailed Date: Mar. 12, 2013, 24 pages.
"Response to Non-Final Office Action for U.S. Appl. No. 13/084,786", Mailed Date: Mar. 12, 2013, filed Jun. 12, 2013, 13 pages.
"Final Office Action for U.S. Appl. No. 13/084,786", Mailed Date: Jul. 17, 2013, 27 pages.
"Request for Continued Examination and Response to Final Office Action for U.S. Appl. No. 13/084,786", Mailed Date: Jul. 17, 2013, filed Oct. 17, 2013, 16 pages.
"Non-Final Office Action for U.S. Appl. No. 13/074,041", Mailed Date: Feb. 1, 2013, 22 pages.
"Response to Non-Final Office Action for U.S. Appl. No. 13/074,041", Mailed Date: Feb. 1, 2013, filed May 29, 2013, 15 pages.
"Non-Final Office Action for U.S. Appl. No. 13/074,041", Mailed Date: Aug. 23, 2013, 20 pages.
"Response to Non-Final Office Action for U.S. Appl. No. 13/074,041", Mailed Date: Aug. 23, 2013, filed Dec. 3, 2013, 19 pages.
"Final Office Action for U.S. Appl. No. 13/074,041", Mailed Date: Jan. 8, 2014, 23 pages.
"Request for Continued Examination and Response to Final Office Action for U.S. Appl. No. 13/074,041", Mailed Date: Jan. 8, 2014, filed Apr. 30, 2014, 19 pages.
"Non-Final Office Action for U.S. Appl. No. 13/074,041", Mailed Date: Jun. 23, 2014, 21 pages.
"Response to Non-Final Office Action for U.S. Appl. No. 13/074,041", Mailed Date: Jun. 23, 2014, filed Sep. 23, 2014, 16 pages.
"Final Office Action for U.S. Appl. No. 13/074,041", Mailed Date: Oct. 9, 2014, 25 pages.
"Restriction Requirement for U.S. Appl. No. 12/241,281", Mailed Date: Jun. 21, 2011, 7 pages.
"Response to Restriction Requirement for U.S. Appl. No. 12/241,281", Mailed Date: Jun. 21, 2011, filed Jul. 20, 2011, 7 pages.
"Non-Final Office Action for U.S. Appl. No. 12/241,281", Mailed Date: Aug. 25, 2011, 26 pages.
"Response to Non-Final Office Action for U.S. Appl. No. 12/241,281", Mailed Date: Aug. 25, 2011, filed Nov. 2, 2011, 13 pages.
"Final Office Action for U.S. Appl. No. 12/241,281", Mailed Date: Jan. 6, 2012, 27 pages.
"Request for Continued Examination and Response to Final Office Action for U.S. Appl. No. 12/241,281", Mailed Date: Jan. 6, 2012, filed May 2, 2012, 14 pages.
"Non-Final Office Action for U.S. Appl. No. 12/241,281", Mailed Date: Jul. 20, 2012, 21 pages.
"Response to Non-Final Office Action for U.S. Appl. No. 12/241,281", Mailed Date: Oct. 22, 2012, 13 pages.
"Notice of Allowance for U.S. Appl. No. 12/241,281", Mailed Date: Dec. 24, 2012, 10 pages.
"First Office Action for CN Patent Application No. 200980139375.3", Mailed Date: Dec. 18, 2012, 14 pages.
"Response to First Office Action for CN Patent Application No. 200980139375.3", Mailed Date: Dec. 18, 2012, Filed Date: Apr. 19, 2013, 14 pages.
"Second Office Action for CN Patent Application No. 200980139375.3", Mailed Date: Aug. 7, 2013, 11 pages.
"Response to Second Office Action for CN Patent Application No. 200980139375.3", Mailed Date: Aug. 7, 2013, filed Aug. 30, 2013, 15 pages.
"Third and Final Office Action for CN Patent Application No. 200980139375.3", Mailed Date: Jan. 8, 2014, 10 pages
"Notice on Reexamination for CN Application No. 200980139375.3", Mailed Date: Aug. 7, 2014, 5 pages.
"First Office Action for Japanese Patent Application No. 2011-530082", Mailed Date: Oct. 1, 2013, 8 pages.
"Response to First Office Action for Japanese Patent Application No. 2011-530082", Mailed Date: Oct. 1, 2013, Filed Date: Dec. 26, 2013, 11 pages.
"Second Office Action for Japanese Patent Application No. 2011-530082", Mailed Date: Mar. 11, 2014, 8 pages.
"Response to Second Office Action for Japanese Patent Application No. 2011-530082", Filed Jul. 10, 2014, 6 pages.
"Non-Final Office Action for U.S. Appl. No. 13/851,797", Mailed Date: Apr. 10, 2014, 22 pages.
"Response to Non-Final Office Action Mailed Apr. 10, 2014, for U.S. Appl. No. 13/851,797", filed Jun. 16, 2014, 14 pages.
"Notice of Allowance for U.S. Appl. No. 13/851,797", Mailed Date: Aug. 21, 2014, 10 pages.
"Notice of Allowance for U.S. Appl. No. 13/851,797", Mailed Date: Dec. 5, 2014, 13 pages.
"Decisions on Reexamination for CN Application No. 200980139375.3", Mailed Date: Jan. 28, 2015 11 pages.
"Response to Final Office Action Mailed Oct. 9, 2014 for U.S. Appl. No. 13/074,041", filed Jan. 9, 2015, pages.
"Request for Continued Examination and Response to Final Office Action," From U.S. Appl. No. 13/074,041, filed Jan. 9, 2015.
"Voluntary Amendment" From Chinese Patent Application No. 201210037656.5, Filed May 29, 2014.
Hailpern, et al., "Team Storm: Demonstrating an interaction Model for Working with Muitpie Ideas During Creative Group Work", Proceedings of the 6th ACM SIGCHI Conference on Creativity & Cognition, Jun. 13-10, 2007.
Haller, et al., "Shared Design Space," ACM SIGGRAPH 2006 Emerging Technologies, International Conference on Computer Graphics and Interactive Techniques, Article 29, 12 pages.
Holman, et al., "Paper Windows Interaction Techniques for Digital Paper". Proceedings of the SIGCHI Conference on Human Factors in Computing Systems, Apr. 2-7, 2005, pp. 591-599.
Klemmer, et al., "The Designers' Outpost: a Task-Centered Tangibie Interface for Web Site Information Design", Retrieved at <<http://www.si.umich.edu/mwnewman/pubs/uist2001>>, 2001, 10 pages.

(56) References Cited

OTHER PUBLICATIONS

Klemmer, "Integrating Physical and Digital Interactions", Computer.org, Oct. 2005. pp. 111-113.
Klemmer, et al., "How Bodies Matter: Five Themes for Interaction Design". Proceedings of the Designing Interactive Systems, Jun. 26-28, 2006, pp. 140-149.
Koshiimizu, et al., "SnapTable: Physical Handling for Digital Documents with Electronic Paper", Proceedings of the Third Nordic Conference on Human-Computer Interaction, Oct. 23-27, 2004, pp. 401-404.
Lange, et al., "Insight Lab: An Immersive Team Environment Linking Paper, Displays, and Data," Proceedings of the 1998 Conference on Human Factors in Computing Systems, 1998, pp. 550-557.
Liao, et al., "PapierCraft A Command System for Interactive Paper", UIST '05, Oct. 23-27, 2005, 4 pages.
Leithinger, et al. "Improving Menu Interaction for Cluttered Tabletop Setups with User-Drawn Path Menus"; Second Annual IEEE International Workshop on Horizontal Interactive Human-Computer System, 2007, pp.
Lin, et al., "Denim: Finding a Tighter Fit Between Tools and Practice for Web Site Design", Proceedings of the SIGCHI Conference on Human Factors in Computing Systems, 2000, 8 pages.
Matsushita et al., "HolosWall Designing a Finger: Hand Body and Object Sensitive Wall," UIST 97 Banff, Alberta, Canada, ACM Press, 1997 pp. 209-210.
Moggridge, Bill, "Designing Intefactions", book published by MIT Press, 2007, table of contents, Retrieved at <<http//www.designinginteractions.com/chapters>>. accessed on Jan. 8, 2009, 1 page.
Moraveji, et al., "Mischief Supporting Remote, Teaching in Developing Regions", Proceeding of the Twenty-Sixth Annual SIGCHI Conference on Human Factors in Computing Systerns, Apr. 5-10, 2008, pp. 353-362.
Newman, et al., "Sitemaps, Storyboards, and Specifications: A Sketch of Web Site Design Practice", Proceedings of the 3rd Conference on Designing Interactive Systems. Processes, Practices, Methods and Techniques 2000, pp. 263-274.
Olsen, et al., "Spilling: Expanding Hand Held Interaction to Touch Table Displays", Second Annual IEEE International Workshop on Horizontal Interactive Human-Computer System, 2007, pp. 183-170.
Parker, et al., "TractorBeam: Seamless Integration of Local and Remote Pointing for Tabletop Displays". Proceedings of Graphics Interface 2005, 2005, pp. 33-40.
Patten, et al., "Sensetable: A Wireless Object Tracking Platform for Tangible User Interactions". Proceedings of CHI 2001, ACM Press, Mar. 31-Apr. 5, 2001, 8 pages.
Rekimoto, et al., "Augmented Surfaces: a Spatially Continuous Work Space for Hybrid Computing Environments". Proceedings of the SIGCHI conference on Human factors in Computing Systems the CHI is the Limit, 1999, pp. 378-385.
Rekimoto, et al., "DataTiles: A Modular Platform for Mixed Physical and Graphical Interactions", Proceedings of the SIGCHI Conference on Human Factors in Computing Systems, Mar. 31-Apr. 4, 2001, pp. 269-276.
Shen et al., "DiamondSpin: An Extensible Toolkit for Around-the-Table interaction", Proceedings of the SIGCHI Conference on Human Factors in Computing Systems, Apr. 24-29, 2004, pp. 167-474.
Sokoler: et al., "Physically Embodied Video Snippets Supporting Collaborative Exploration of Video Material During Design Sessons", Proceedings of the Second Nordic Conference on Human-Computer Interaction; 2002, pp. 139-148.
Subrahmanian, et al., "Boundary Objects and Prototypesat the Interfaces of Engineering Design", Computer Supported Cooperative Work, vol. 12, Issue 2, 2003, pp. 185-203, ACM abstract provided only, 2 pages.

Tang, et al., "A Framework for Understanding the Workspace Activity of Design Teams", Proceedings of the 1988 ACM Conference on Computer-Supported Cooperative Work, 1988. pp. 244-249.
Hinrichs, et al., "Examination of Text-Entry Methods for Tabletop Displays", Proceedings of the Second Annual IEEE International Workshop on Horizontal Interactive Human-Computer Systems, 2007, pp. 105-112.
Underkoffler, et al., "Urp: a Luminous-Tangible Workbench for Urban Planning and Design," Proceedings of the SIGCHI Conference on Human Factors in Computing Systems: the CHI is the Limit, May 15-20, 1999 pp. 389-393.
Wellner, Pierre, "Interacting with Paper on the DigitalDesk ", Communications of the ACM, vol. 36, No. 7, Jul. 1993, pp. 87-98.
Wilson, et al., "FlowMouse: A Computer Vision-Based Pointing and Gesture Input Device", Retrieved at <<http//research.microsoft.com/~cutrell/interact2005FlowMouse.pdf>>, Interact, 2005, 14 pages.
Wu et al., "Gesture Registration: Relaxation, and Reuse for Multi-Point Direct-Touch Surfaces", Proceedings of the First IEEE International Workshop on Horizontal Interactive Human-Computer Systems Tabletop '06),IEEE Computer Society, 8 pages.
Zhang, et al., "Visual Panel: Virtual Mouse, Keyboard and 3D Controller with an Ordinary Piece of Paper", Proceedings of the 2001 Workshop on Perceptive User Interfaces, 2001, 8 pages.
"Dynamical simulation", Retrieved at <<http://en.wikipedia.org/wiki/Dynamical_simulation>>. Wikipedia entry. Retrieved on Mar. 9, 2011, 4 pages.
"Physics engine", Retrieved at <<http://en.wikipedia.org/wiki/Physics_engine>>, Wikipedia entry, Retrieved on Mar. 9, 2011, 7 pages.
Anderson, et al., "Tangible Interaction + Graphical Interpretation: A New Approach to 3D Modeling", in Proceedings of the 27th Annual Conference on Computer Graphics and Interactive Techniques, Mitsubishi Electric Information Technology Center America, Technical Report No. TR-2000-13, Apr. 2000, Cambridge, MA, 12 pages.
Billinghurst, et al., "Tangible Augmented Reality", ACM Special Interest Group on Computer Graphics and Interactive Techniques, 2008, 10 pages.
Everitt, Cass, "Projective Texture Mapping", Retrieved at <<http://developer.nvidia.com/object/Projective_Texture_Mapping.html>>, Nvidia, Santa Clara, CA, 2001, 7 pages.
Fitzmaurice, et al., "Bricks: Laying the Foundations for Graspable User Interfaces", Proceedings of the SIGCHI Conference on Human Factors in Computing Systems, 1995, 8 pages.
Grossman, et al., "An interface for Creating and Manipulating Curves Using a High Degree-of-Freedom Curve Input Device", Proceedings of the SIGCHI Conference on Human Factors in Computing Systems, Apr. 5-10, 2003, 8 pages.
Hilliges, et al., "Interactions in the Air: Adding Further Depth to Interactive Tabletops", Proceedings of the 22nd Annual ACM Symposium on User interface Software and Techology, Oct. 4-7, 2009, pp. 139-148.
Hosokawa, et al., "Tangible Design Support System Using RFID Technology", Proceedings of the 2nd International Conference on Tangible and Embedded Interaction (TEI '08), Feb. 18-20, 2008, pp. 75-78.
Kitamura. et al., "Real-time 3D Interaction with ActiveCube", CHI '01 Extended Abstracts on Human Factors in Computing Systems, Mar. 31-Apr. 5, 2001, pp. 355-356.
Koike, et al., "Integrating Paper and Digital Information on EnhancedDesk: A Method for Realtime Finger Tracking on an Augmented Desk System", ACM Transactions on Computer-Human Interaction, vol. 8, No. 4, Dec. 2001.
Lavoie, et al., "Constructing 3D Virtual Reality Objects from 2D Images of Real Objects Using NURBS", Proceedings of the IEEE International Conference on Virtual Environments, Human-Computer Interfaces, and Measurement Systems, Jun. 25-27, 2007, pp. 117-124.
Leibe, et al., "Toward Spontaneous Interaction with the Perceptive Workbench", IEEE Computer Graphics and Applications, Nov./Dec. 2000, 12 pages.

(56) References Cited

OTHER PUBLICATIONS

Leibe, et al., "The Perceptive Workbench Towards Spontaneous and Natural Interaction on Semi-Immersive Virtual Environments", Technical Report No. GIT-GVU-99-33, Georgia Institute of Technology, 1999, 9 pages.

Piper, et al., "Illuinating Clay: A 3-D Tangible Interface for Landscape Analysis", Proceedings of the SIGCHI Conference on Human Factors in Computing Systems, Apr. 21-25, 2002, 8 pages.

Raffle, at at, "Topobo: A Constructive Assembly System with Kinetic Memory", Proceedings of the SIGCHI Conference on Human Factors in Computing Systems, Apr. 24-29, 2004, 8 pages.

Rosenblum, Lawrence, J. "Applications of the Responsive Workbench," Retrieved at <<http://ieeexplore.ieee.org/stamp/stamp.jsp?tp=arnumber=595260>>, IEEE Computer Graphics and Applications, vol. 17, No. 4, Jul./Aug. 1997, pp. 10-15.

Segal, at al., "Fast Shadows and Lighting Effects Using Texture Mapping", Proceedings of the 19th Annual Conference on Computer Graphics and Interactive Techniques, Jul. 1992, pp. 249-252.

Starner, et al., "The Perceptive Workbench: Computer-vision-based Gesture Tracking, Object Tracking, and 3D Reconstruction for Augmented Desks", Machine Vision and Applications (2003), vol. 14, Springer-Verlag, 2003, pp. 59-71.

Ullmer, et al., "The metaDESK: Models and Prototypes for Tangible User Interfaces", Proceedings of the 10th Annual ACM Symposium on User Interface Software and Technology, Oct. 14-17, 1997, 10 pages.

Wilson, et al., "Bringing Physics to the Surface, " Proceedings of the 21st Annual ACM Symposium on User Interface Software and Technology, Oct. 19-22, 2008, pp. 67-76.

Wilson, et al., "Combining Multiple Depth Cameras and Projectors for Interactions On, Above and Between Surfaces", Proceedings of the 23nd Annual ACM Symposium on User Interface Software and Technology, Oct. 3-6, 2010, pp. 273-282.

Wilson, Andrew A., "Simulating Grasping Behavior on an Imaging Interactive Surface", Proceedings of the ACM International Conference on Interactive Tabletops and Surfaces, Nov. 23-25, 2009, pp. 125-132.

International Search Report and Written Opinion for International Application Serial No. PCT/US2012/024786, Mailed Date: Oct. 18, 2012, 8 pages.

"Microsoft Surface"homepage, Retrieved at <<http://www.surface.com>>, accessed on Jan. 7, 2009, 1 page.

"Optimus Maximus Keyboard", Art Lebedev Studio, available at <<http://www.artlebedev.com/everything/optimus/>>, accessed on Jan. 7, 2009, 5 pages.

Agarawala, et al., "Keepin' it Real: Pushing the Desktop Metaphor with Physics, Piles and the Pen", Proceedings of the SIGCHI Conference on Human Factors in Computing Systems, Apr. 22-27, 2006, pp. 1283-1292.

Bell, et al., "Dynamic Space Management for User Interfaces", Proceedings of the UIST 2000: ACM Symposium on User Interface Software and Technology, Nov. 5-8, 2000, pp. 239-248.

Bill Buxton home page, referencing publication "Sketching User Experiences". Retrieved at <<http://www.billbuxton.com/>>, accessed on Jan. 7, 2009, 6 pages.

Brignull, et al., "The Introduction of a Shared Interactive Surface into a Communal Space", Proceedings of the 2004 ACM Conference on Computer Supported Cooperative Work, 2004, 10 pages.

Kim, et al., "Video-Based Document Tracking: Unifying Your Physical and Electronic Desktops," Proceedings of the 17th Annual ACM Symposium on User Interface Software and Technology, 2004, pp. 99-107.

U.S. Appl. No. 13/084,786—Non Final Office Action Mailed Jul. 8, 2015, 29 pages.

U.S. Appl. No. 13/074,041—Non Final Office Action Mailed Apr. 2, 2015, 19 pages.

U.S. Appl. No. 13/851,797—Notice of Allowance Mailed Mar. 24, 2015, 10 pages.

U.S. Appl. No. 13/851,797—Notice of Allowance Mailed Jul. 6, 2015, 10 pages.

U.S. Appl. No. 12/241,281—Applicant Initiated Interview Summary Mailed Nov. 9, 2011, 3 pages.

U.S. Appl. No. 12/241,281—Applicant Initiated Interview Summary Mailed Sep. 20, 2012, 3 pages.

China Patent Application No. CN 200980139375.3—Notice of Allowance with Allowed Claims, Mailed Mar. 2, 2015, 7 pages.

Ashdown et al., "Steerable Projector Calibration," IEEE Computer Society Conference on Computer Vision and Pattern Recognition-Workshops, Jun. 2005, 8 pages.

Benko et al., "Dyadic Projected Spatial Augmented Reality," UIST '14 Proceedings of the 27th annual ACM Symposium on User Interface Software and Technology, Oct. 5-8, 2014, pp. 645-655, 11 pages.

Benko et al., "Multi-Point Interactions with Immersive Omnidirectional Visualizations in a Dome," ACM International Donference on Interactive Tabletops and Surfaces, Nov. 2010, 10 pages.

Benko et al., "MirageTable: Freehand Interaction on a Projected Augmented Reality Tabletop," Proceedings of the SIGCHI Conference on Human Factors in Computing Systems, May 2012, 10 pages.

Bimber et al., "Spatial Augmented Reality: Merging Real and Virtual Worlds", Wellesley: AK Peters, Ltd., Jul. 2005, 393 pages.

Billinghurst et al., "Shared Space: An Augmented Reality Approach for Computer Supported Collaborative Work", Virtual Reality, vol. 3, No. 1, Mar. 1998, pp. 25-36, 12 pages.

Bolt, Richard A., ""Put-That-There": Voice and Gesture at the Graphics Interface," SIGGRAPH '80 Proceedings of the 7th Annual Conference on Computer Graphics and Interactive Techniques, Jul. 1980, 9 pages.

Borkowski et al., "Spatial Control of Interactive Surfaces in an Augmented Environment," Proceedings of the 2004 International Conference on Engineering Human Computer Interaction and Interactive Systems, Jul. 2004, 16 pages.

Butz et al., "Applying the Peephole Metaphor in a Mixed-Reality Room," Computer Graphics and Applications, vol. 26, No. 1, Jan. 2006, 8 pages.

Butz et al., "SearchLight—A Lightweight Search Function for Pervasive Environments," Proceedings of the Second International Conference on Pervasive Computing, Apr. 2004, 6 pages.

Cao et al., "Multi-User Interaction Using Handheld Projectors," Proceedings of the 20th Annual ACM Symposium on User Interface Software and Technology, Oct. 2007, 10 pages.

Ehnes et al., "Projected Augmentation—Augmented Reality Using Rotatable Video Projectors," Third IEEE and ACM International Symposium on Mixed and Augmented Reality, Nov. 5, 2004, 10 pages.

Harrison et al., "OmniTouch: Wearable Multitouch Interaction Everywhere," Proceedings of the 24th Annual ACM Symposium on User Interface Software and Technology, Oct. 2011, 10 pages.

Izadi et al., "KinectFusion: Real-time 3D Reconstruction and Interaction Using a Moving Depth Camera," Proceedings of the 24th Annual ACM Symposium on User Interface Software and Technology, Oct. 2011, 10 pages.

Kjeldsen et al., "Interacting with Steerable Projected Displays," Proceedings of the Fifth IEEE International Conference on Automatic Face and Gesture Recognition, May 21, 2002, 6 pages.

Levy, Steven, "Google Gets Transparent with Glass, Its Augmented Reality Project," retrieved at <<http://www.wired.com/business/2012/04/epicenter-google-glass-ar/>>, on Apr. 4, 2012, 11 pages.

"Stereoscopy," retrieved at <<http://en.wikipedia.org/wiki/Stereoscopy>>, on Apr. 8, 2011, 21 pages.

Molyneaux et al., "Cooperative Augmentation of Smart Objects with Projector-Camera Systems," The 9th International Conference on Ubiquitous Computing, Sep. 2007, 18 pages.

Molyneaux et al., "Interactive Environment-Aware Handheld Projectors for Pervasive Computing Spaces," Proceedings of the 10th International Conference on Pervasive Computing, Jun. 2012, 18 pages.

"Structured Light 3D Scanning," retrieved at <<http://sites.google.com/site/structuredlight/techniques>>, on Nov. 26, 2010, 3 pages.

Ngan et al., "Calibrating a Pan-Tilt Camera Head," Image and Vision Computing Workshop, Dec. 1995, 6 pages.

(56) References Cited

OTHER PUBLICATIONS

Pinhanez, Claudio, "Augmenting Reality with Projected Interactive Displays," Proceedings of the International Symposium on Virtual and Augmented Architecture, Jun. 2001, 9 pages.

Pinhanez, Claudio, "The Everywhere Displays Projector: A Device to Create Ubiquitous Graphical Interfaces," The 3rd International Conference on Ubiquitous Computing, Sep. 2001, 18 pages.

Raskar et al., "iLamps: Geometrically Aware and Self-Configuring Projectors," SIGGRAPH '06 Special Interest Group on Computer Graphics and Interactive Techniques Conference, Jul. 2006, 10 pages.

Raskar et al., "The Office of the Future: A Unified Approach to Image-Based Modeling and Spatially Immersive Displays." Proceedings of the 25th Annual Conference on Computer Graphics and Interactive Techniques, Jul. 1998, 10 pages.

Raskar et al. "Multi-Projector Displays Using Camera-Based Registration", Visualization'99, Oct. 1999, 9 pages.

Raskar et al., "Shader lamps: Animating Real Objects with Image-Based Illumination", Rendering Techniques, Jun. 2001, 10 pages.

Allen, Jonas, "I-Cocoon: The Next Wii?" retrieved at<<http://www.dailygame.net/electronics/i-cocoon-the-next-wii>>, on Sep. 11, 2008, 4 pages.

Sodhi et al., "Kinect-Projector Calibration", CS 498 Computational Photography—Final Project, University of Illinois at Urbana-Champaign, Dec. 14, 2010, 11 pages.

Sodhi et aL,"Lightguide: Projected Visualizations for Hand Movement Guidance", Proceedings of the SIGCHI conference on Human Factors in Computing Systems, May 2012, 10 pages.

Ates et al., "Immersive Simulation of Visual Impairments Using a Wearable See-through Display," Proceedings of the 8th International Conference on Tangible, Embedded and Embodied Interaction Feb. 16, 2014, 4 pages.

Baribeau et al., "Color Reflectance Modeling Using a Polychromatic Laser Range Sensor", retrieved at <<http://www.cs.virginia.edu/~mjh7v/bib/Baribeau92.pdf>>, Feb. 1992, pp. 263-269, 7 pages.

Bishop, Todd, "Q&A: Microsoft LightSpace, One Step Closer to Star Trek Holodeck", retrieved at <<http://www.techflash.com/seattle/2010/10/qa_microsoft_lightspace_one_step_closer_to_star_trek_holodeck.html>>, Oct. 7, 2010, 4 pages.

Chauchard et al., "Steerable Projection: Exploring Alignment in Interactive Mobile Displays", Personal and Ubiquitous Computing, vol. 16, No. 1, Jan. 2012, pp. 27-37, 11 pages.

Dietz et al., "DiamondTouch: a Multi-User Touch Technology," Proceedings of the 14th Annual ACM Symposium on User Interface Software and Technology, 2001, pp. 219-226, 8 pages.

Fuchs et al., "Augmented Reality Visualization for Laparoscopic Surgery", retrieved at <<http://www.cs.odu.edu/~jrcrouch/papers/AR_Laparoscope.pdf>>, Lecture Notes in Computer Science, vol. 1496, Proceedings of the First International Conference on Medical Image Computing and Computer-Assisted Intervention, Oct. 11-13, 1998, 10 pages.

Gargallo et al., "Bayesian 3D Modeling from Images using Multiple Depth Maps", retrieved at <<http://citeseerx.ist.psu.edu/viewdoc/download?doi=10.1.1.143.8508&rep=rep1&type=pdf>>, Proceedings of the 2005 IEEE Computer Society Conference on Computer Vision and Pattern Recognition (CVPR'05), vol. 2, Jun. 20-26, 2005, 7 pages.

Gingichashvili, Sarah, "PlayAnywhere—Microsoft's Interactive Playground", retrieved at <<http://thefutureofthings.com/news/1037/playanywhere-microsofts-interactive-playground.html>>, Nov. 2, 2007, 2 pages.

Henrysson et al., "Face to Face Collaborative AR on Mobile Phones," Proceedings from the Fourth IEEE and ACM International Symposium on Mixed and Augmented Reality, Oct. 5-8, 2005, pp. 80-89, 11 pages.

Jota et al., "Constructing Virtual 3D Models with Physical Building Blocks", Proceedings of the CHI'11 Extended Abstracts on Human Factors in Computing Systems, May 7-12, 2011, pp. 2173-2178, 6 pages.

Klemmer et al., "The Designers' Outpost: a Tangible Interface for Collaborative Web Site," Proceedings of the 14th Annual ACM Symposium on User Interface Software and Technology, ACM, Nov. 2001, pp. 1-10, 10 pages.

Klemmer et al., "The Designers' Outpost: a Task-Centered Tangible Interface for Web Site Information Design," CHI'00 Extended Abstracts on Human Factors in Computing Systems, pp. 333-334, ACM, Apr. 2000, 2 pages.

Luus et al., "Optimization by Direct Search and Systematic Reduction of the Size of Search Region", American Institute of Chemical Engineering Journal, vol. 19, No. 4, Jul. 1973, pp. 760-766, 7 pages.

Manabe et al., "Three Dimensional Measurement using Color Structured Patterns and Imaging Spectrograph", retrieved at <<http://ieeexplore.ieee.org/stamp/stamp.jsp?arnumber=01048022>>, on Dec. 10, 2002, pp. 349-652, 4 pages.

Nakashima et al., "An Integrated 2D-3D Work Environment for Cooperative Modeling," Journal of Electronics, Information and Communication Engineers Technical Report, vol. 103, Issue 639, Jan. 26, 2004, pp. 41-46, 6 pages.

Nguyen et al., "Depth image-based rendering from multiple cameras with 3D propagation algorithm", retrieved at <<http://portal.acm.org/citation.cfm?id=1594116&dl=GUIDE&coll=GUIDE&CFID=85935589&CFTOKEN=23121094, International Conference on Immersive Telecommunications, Proceedings of the 2nd International Conference on Immersive Telecommunications, May 27-29, 2009, 6 pages.

Ohta et al., "Share-Z: Client/Server Depth Sensing for See-Through Head Mounted Displays", retrieved at <<http://image-ww.esys.tsukuba.ac.jp/research/publications/ohta_ISMR_2001Mar.pdf>>, Presence: Teleoperators and Virtual Environments, vol. 11, No. 2, Apr. 2002, 9 pages.

Song et al., "Use of LCD Panel for Calibrating Structured-Light-Based Range Sensing System", IEEE Transactions on Instrumentation and Measurement, 2008, vol. 57, No. 11, pp. 2623-2630, 8 pages.

Tsai et al., "A New Technique for Fully Autonomous and Efficient 3D Robotics Hand/Eye Calibration", IEEE Transactions on Robotics and Automation, vol. 5, No. 3, Jun. 1989, pp. 345-358, 14 pages.

Underkoffler et al., "Emancipated Pixels: Real-World Graphics in the Luminous Room", Proceedings of the 26th Annual Conference on Computer Graphics and Interactive Techniques, ACM Press/Addison-Wesley Publishing Co., Jul./Aug. 1999, 8 pages.

Willis et al., "SideBySide: Ad-hoc Multi-user Interaction with Handheld Projectors," Proceedings of the 24th Annual ACM Symposium on User Interface Software and Technology, ACM, Oct. 16, 2011, 10 pages.

Wilson et al., "Steerable Augmented Reality with the Beamatron", Proceedings of the 25th Annual ACM Symposium on User Interface Software and Technology, Oct. 2012, pp. 413-422, 10 pages.

Wilson et al. "Steerable Augmented Reality with the Beamatron", retrieved at <<http://research.microsoft.com/en-us/um/people/awilson/publications/WilsonUIST2012/WilsonUIST2012.html>>, on Oct. 2012, 1 page.

Wilson et al., "Combining Multiple Depth Cameras and Projectors for Interactions on, above and between Surfaces", Proceedings of the 23nd Annual ACM Symposium on User Interface Software and Technology, Oct. 2010, pp. 273-282, 10 pages.

Wilson et al., "Depth-Sensing Video Cameras for 3D Tangible Tabletop Interaction", Second Annual IEEE International Workshop on Horizontal Interactive Human-Computer Systems, Tabletop '07, Oct. 10-12, 2007, pp. 201-204, 4 pages.

Zhang et al., "A Flexible New Technique for Camera Calibration", IEEE Transaction on Pattern Analysis and Machine Intelligence, vol. 22, No. 11, Nov. 1, 2000, pp. 1330-1334, 5 pages.

Zhou et al., "Multi-Projector Display with Continuous Self-Calibration", retrieved at <<http://vis.uky.edu/~wangl/Research/Publication/2008/continuous_display_procams08.pdf>>, International Conference on Computer Graphics and Interactive Techniques, Proceedings of the 5th ACM/IEEE International Workshop on Projector Camera Systems, Aug. 10, 2008, 7 pages.

(56) References Cited

OTHER PUBLICATIONS

Miyashita, Tomoya, "Estimation of Spectral Reflectance using Non-Calibrated Cameras and Accuracy Verification," Journal of Information Processing Society of Japan, Aguust 15, 2010, pp. 1-6.
Morimoto, Sakyua, "1-chip three dimensional image sensor," Image Laboratory, vol. 15, No. 7, Japan Industrial Publishing Co., Ltd., Jul. 1, 2004, vol. 15, pp. 55-60.
Shimamura, Jun, "Observation position-dependent image display in dynamic actual environment using projector," Journal of Virtual Reality Society of Japan (NPO), Jun. 30, 2005, vol. 10, No. 2, pp. 145-153.
Wilson, Andrew D., "Depth-Sensing Video Cameras for 3D Tangible Tabletop Interaction", Retrieved at <<http://research.microsoft.com/en-us/um/people/awilson/publications/WilsonTabletop2007/WilsonTabletop2007.html>>, on Apr. 14, 2010, 2 pages.
U.S. Appl. No. 61/307422, Benko et al., "Providing an Interactive Experience Using a 3D Depth Camera and a 3D Projector," filed Feb. 7, 2011, 18 pages.
Non-Final Office Action mailed Dec. 24, 2012 from U.S. Appl. No. 12/819,230, 18 pages.
Response tiled Mar. 24, 2013 to Non-Final Office Action mailed Dec. 24, 2012 from U.S. Appl. No. 12/819,230, 16 pages.
Final Office Action mailed May 9, 2013 from U.S. Appl. No. 12/819,230, 26 pages.
Response filed Oct. 11, 2013 to Final Office Action mailed May 9, 2013 from U.S. Appl. No. 12/819,230, 13 pages.
Notice of Allowance mailed Jan. 8, 2014 from U.S. Appl. No. 12/819,230, 13 pages.
International Search Report mailed Oct. 24, 2011 from PCT Patent Application No. PCT/US2011/024925, 11 pages.
International Preliminary Report on Patentability mailed Sep. 7, 2012 from PCT Patent Application No. PCT/US2011/024925, 2 pages.
Office Action mailed Jun. 20, 2013 from China Patent Application No. 201180010523.9, 15 pages.
Response filed Oct. 30, 2013 to Office Action mailed Jun. 20, 2013 from China Patnet Application No. 201180010523.9, 11 pages.
Notice of Allowance mailed Jan. 21, 2014 from China Patent Application No. 201180010523.9, 8 pages.
Search Report/Office Action mailed May 13, 2014 from European Patent Application No. 11747870.1, 3 pages.
Examination Report mailed May 23, 2014 from European Patent Application No. 11747870.1, 7 pages.
Response filed Jun. 25, 2014 to the Examination Report mailed May 23, 2014 from European Patent Application No. 11747870.1, 10 pages.
Decision to Refuse mailed Jun. 3, 2015 from European Patent Application No. 11747870.1, 4 pages.
Office Action mailed Dec. 4, 2014 from Japan Patent Application No. 2012-555036, 7 pages.
Response tiled Feb. 2, 2015 to Office Action mailed Dec. 4, 2014 from Japan Patent Application No. 2012-555036, 9 pages.
Notice of Allowance mailed Apr. 21, 2015 from Japan Patent Application No. 2012-555036, 5 pages.
Preliminary Amendment filed Aug. 9, 2013 from U.S. Appl. No. 13/039,179, 3 pages.
Non-Final Office Action mailed Nov. 29, 2013 from U.S. Appl. No. 13/039,179, 31 pages.
Response filed Feb. 25, 2014 from U.S. Appl. No. 13/039,179, 14 pages.
Non-Final Office Action mailed Jul. 2, 2014 from U.S. Appl. No. 13/039,179, 24 pages.
Response filed Oct. 2, 2014 from U.S. Appl. No. 13/039,179, 13 pages.
Final Office Action mailed Nov. 5, 2014 from U.S. Appl. No. 13/039,179, 25 pages.
International Search Report and Written Opinion mailed Sep. 28, 2012 from PCT Patent Application No. PCT/US2012/026823, 6 pages.
International Preliminary Report on Patentability mailed Sep. 12, 2013 from PCT Patent Application No. PCT/US2012/026823, 2 pages.
Voluntary Amendment filed Jun. 20, 2014 from China Patent Application No. 201210051745.1, 15 pages.
Notice on the First Office Action mailed Dec. 21, 2015 from China Patent Application No. 201210051745.1, 15 pages.
Office Action and Search Report mailed Nov. 12, 2015 from Taiwan Patent Application No. 13100769.4, 10 pages.
Supplementary Search Report mailed Jul. 25, 2014 from European Patent Application No. 12752325.6, 4 pages.
Office Action mailed Aug. 6, 2014 from European Patent Application No. 12752325.6, 8 pages.
Response filed Nov. 17, 2014 to Office Action mailed Aug. 6, 2014 from European Patent Application No. 12752325.6, 10 pages.
Request for Examination and Voluntary Amendment filed Jan. 13, 2015 from Japan Patent Application No. 2013-556783, 8 pages.
Notice of Rejection mailed Jan. 29, 2016 from Japan Patent Application No. 2013-556783, 11 pages.
Response filed Oct. 6, 2015 to Non-Final Office Action mailed Jul. 8, 2015 from U.S. Appl. No. 13/084,786, 18 pages.
Final Office Action mailed Nov. 27, 2015 from U.S. Appl. No. 13/084,786, 22 pages.
U.S. Appl. No. 61/444,123, filed Feb. 17, 2011, entitled "Providing an Interactive Experience Using a 3D Depth Camera and 3D Projector," Inventor: Benko et al., 53 pages.
Response filed Aug. 21, 2015 to Office Action mailed Apr. 2, 2015 from U.S. Appl. No. 13/074,041, 14 pages.
Notice of Allowance mailed Sep. 16, 2015 from U.S. Appl. No. 13/074,041, 5 pages.
Notice of Allowance mailed Jan. 4, 2016 from U.S. Appl. No. 13/074,041, 41 pages.
International Preliminary Report on Patentability mailed Aug. 21, 2013 from PCT Patent Application No. PCT/US2012/24786, 2 pages.
Notice on the First Office Action mailed Feb. 23, 2016 from China Patent Application No. 2012100376665, 10 pages.
U.S. Appl. No. 61/749,779, Wilson et al., "Immersive Display with Peripheral Illusions," filed Jan. 7, 2013, 23 pages.
Preliminary Amendment filed Aug. 30, 2013 from U.S. Application No. 13/891,116, 4 pages.
Non-Final Office Action mailed Jan. 14, 2015 from U.S. Appl. No. 13/891,116, 13 pages.
Response filed Jul. 14, 2015 from U.S. Appl. No. 13/891,116, 10 pages.
Non-Final Office Action mailed Oct. 28, 2015 from U.S. Appl. No. 13/891,116, 7 pages.
Response filed Feb. 29, 2016 to Non-Final Office Action mailed Oct. 28, 2015 from U.S. Appl. No. 13/891,116, 13 pages.
U.S. Appl. No. 61/772,280, Benko et al., "Steerable Augmented Reality with the Bearmatron," filed Mar. 4, 2013, 46 pages.
Non-Final Office Action mailed Apr. 27, 2015 from U.S. Appl. No. 14/037,986, 27 pages.
Response filed Jul. 27, 2015 from U.S. Appl. No. 14/037,986, 12 pages.
Notice of Informal or Non-Responsive Amendment mailed Jul. 31, 2015 from U.S. Appl. No. 14/037,986, 2 pages.
Response filed Sep. 30, 2015 from U.S. Appl. No. 14/037,986, 12 pages.
Final Office Action mailed Nov. 18, 2015 from U.S. Appl. No. 14/037,986, 24 pages.
Response filed Feb. 18, 2016 to Final Office Action mailed Nov. 18, 2015 from U.S. Appl. No. 14/037,986, 12 pages.
Non-Final Office Action mailed Mar. 29, 2016 from U.S. Appl. No. 14/037,986, 40 pages.
"Auto Yoke The First Automated Lighting Solution Designed for Theatrical Use", retrieved at <<http://web.archive.org/web/20120309060116/http://www.citytheatrical.com/rcyoke.htm>>, on Mar. 9, 2012, 2 pages.
"Great Films Fill Rooms", retrieved at <<http://greatfilmsfillrooms.com/en/>>, on Feb. 19, 2013, 1 page.

(56) References Cited

OTHER PUBLICATIONS

"Liquid Crystal Shutter Glasses", retrieved at <<http://en.wikipedia.org/wiki/Active_shutter_glasses>>, on Apr. 8, 2011, 5 pages.
"Microsoft Office Labs", retrieved at <<http://www.microsoft.com/office/labs/index.html>>, on Feb. 19, 2013, 7 pages.
"Newton Game Dynamics", retrieved at <<http://web.archive.org/web/20130222075951/http://newtondynamics.com/forum/newton.php>>, on Feb. 22, 2013, 2 pages.
"Stereoscopy," retrieved at <<http://en.wikipedia.org/wiki/Stereoscopy#Complementary_color_anaglyphs, on Apr. 8, 2011, 34 pages.
"Liquid Crystal Shutter Glasses," retrieved at <<http://en.wikipedia.org/wiki/Active-shutter-glasses>>, on Apr. 8, 2011, 15 pages.
Kanade et al., "A Stereo Machine for Video-rate Dense Depth Mapping and Its New Applications", IEEE Computer Society Conference on Computer Vision and Pattern Recognition, Jun. 1996, pp. 196-202, 7 pages.
Miyagawa et al., "CCD-Based Range-Finding Sensor", IEEE Transactions on Electron Devices, vol. 44 No. 10, Oct. 1997, pp. 1648-1652, 5 pages.
Rosenhahn et al., "Automatic Human Model Generation", International Conference on Computer Analysis of Images and Patterns, Sep. 2005, pp. 41-48, 8 pages.
Aggarwal et al., "Human Motion Analysis: A Review", IEEE Nonrigid and Articulated Motion Workshop, University of Texas at Austin, Austin, TX, Jun. 1997, pp. 90-102, 13 pages.
Shao et al., "An Open System Architecture for a Multimedia and Multimodal User Interface", 3rd TIDE Congress, Japanese Society for Rehabilitation of Persons with Disabilities (JSRPD), Japan, Aug. 24, 1998, 8 pages.
Kohler, Markus, "Special Topics of Gesture Recognition Applied in Intelligent Home Environments", Proceedings of the Gesture Workshop, Sep. 1998, pp. 285-296, 12 pages.
Kohler, Markus, "Vision Based Remote Control in Intelligent Home Environments", 3D Image Analysis and Synthesis, University of Erlangen-Nuremberg, Germany, Nov. 1996, pp. 147-154, 8 pages.
Kohler, Markus, "Technical Details and Ergonomical Aspects of Gesture Recognition applied in Intelligent Home Environments", Jan. 1997, Dekanat Informatik, Univ., Germany, 35 pages.
Hasegawa et al., "Human-Scale Haptic Interaction with a Reactive Virtual Human in a Real-Time Physics Simulator", ACM Computers in Entertainment, New York, NY, vol. 4, No. 3, Article 6C, Jul. 2006, pp. 1-12, 12 pages.
Qian et al., "A Gesture-Driven Multimodal Interactive Dance System", IEEE International Conference on Multimedia and Expo (ICME), Taipei, Taiwan, Jun. 2004, pp. 1579-1582, 4 pages.
Zhao, Liang, "Dressed Human Modeling, Detection, and Parts Localization", The Robotics Institute, Carnegie Mellon University, Pittsburgh, PA, CMU-RI-TR-01-19, Jul. 26, 2001, 121 pages.
He, Lei, "Generation of Human Body Models", Doctoral Dissertation, University of Auckland, New Zealand, Apr. 2005, 111 pages.
Isard et al., "Condensation—Conditional Density Propagation for Visual Tracking", International Journal of Computer Vision, 29(1), Netherlands, Aug. 1998, pp. 5-28, 24 pages.
Livingston, Mark Alan, "Vision-based Tracking with Dynamic Structured Light for Video See-through Augmented Reality", Doctoral Dissertation, University of North Carolina at Chapel Hill, North Carolina, USA, 1998, 145 pages.
Wren et al., "Pfinder: Real-Time Tracking of the Human Body", MIT Media Laboratory Perceptual Computing Section IEEE Transactions on Pattern Analysis and Machine Intelligence, Cambridge, MA, Technical Report No. 353, vol. 19, No. 7, Jul. 1997, pp. 780-785, 6 pages.
Breen et al., "Interactive Occlusion and Collusion of Real and Virtual Objects in Augmented Reality", European Computer-Industry Research Center GmbH, Munich, Germany, Technical Report ECRC-95-02, 1995, 22 pages.
Freeman et al., "Television Control by Hand Gestures", Mitsubishi Electric Research Laboratories, Cambridge, MA, TR94-24, Dec. 1994, 7 pages.
Hongo et al., "Focus of Attention for Face and Hand Gesture Recognition Using Multiple Cameras", 4th IEEE International Conference on Automatic Face and Gesture Recognition, Grenoble, France, Mar. 2000, pp. 156-161, 6 pages.
Pavlovic et al., "Visual Interpretation of Hand Gestures for Human-Computer Interaction: A Review", IEEE Transactions on Pattern Analysis and Machine Intelligence, vol. 19, No. 7, Jul. 1997, pp. 677-695, 19 pages.
Azarbayejani et al., "Visually Controlled Graphics", IEEE Transactions on Pattern Analysis and Machine Intelligence, vol. 15, No. 6, Jun. 1993, 4 pages.
Granieri et al., "Simulating Humans in VR", The British Computer Society, Academic Press, Oct. 1994, 15 pages.
Brogan et al., "Dynamically Simulated Characters in Virtual Environments", IEEE Computer Graphics and Applications, vol. 18, Issue 5, Sep./Oct. 1998, pp. 58-69, 12 pages.
Fisher et al., "Virtual Environment Display System", Proceedings of the 1986 ACM Workshop on Interactive 3D Graphics, Chapel Hill, NC, Oct. 1986, 12 pages.
"Virtual High Anxiety", Tech Update, Aug. 1995, p. 22, 1 page.
Sheridan et al., "Virtual Reality Check", Technology Review, Manchester, NH, vol. 96, No. 7, Oct. 1993, pp. 22-28, 9 pages.
Stevens, Jane E., "Flights into Virtual Reality Treating Real World Disorders", The Washington Post, Science Psychology, Mar. 27, 1995, 2 pages.
"Simulation and Training", Division Incorporated, 1994, 6 pages.
International Search Report & Written Opinion mailed Oct. 4, 2013 from PCT Patent Application No. PCT/US2013/053878, 10 pages.
Labutov et al., "Fusin Optical Flow and Stereo in a Spherical Depth Panorama Using a Single-Camera Folded Catadioptric Rig," IEEE International Conference on Robotics and Automation, May 9-13, 2011, pp. 3092-3097, 6 pages.
Taguchi et al., "Axial-Cones: Modelling Spherical Catadioptric Cameras for Wide-Angle Light Field Rendering," 3rd ACM SIGGRAPH Conference and Exhibition on Computer Graphics and Interactive Techniques in Asia, Dec. 3, 2010, 8 pages.
Gao et al., "A Hemispherical Imaging Camera," Computer Vision and Image Understanding Special Issue on Omni-directional Vision, Camera Networks, a dn Non-conventional Cameras, Feb. 2010, pp. 1-29, 29 pages.
Meilland et al., "An Augmented Spherical Visual Sensor for Large Scale 3D SLAM," Information Signal Image Vision, Jan. 21, 2011, 6 pages.
Blackburn et al., "Incremental 3D Model Generation using Depth Cameras," retrieved at <<http://www.ifp.illinois.edu/~kubacki1/Doc/ECE549FinalProjectReport.pdf>>, retrieved date: Mar. 29, 2012, 8 pages.
"PMD[vision] CamBoard nano reference design," PMD Technologies, retrieved at <<http://www.pmdtec.com/products-services/pmdvisionr-cameras/pmdvisionr-camboard-nano/>>, accessed on: Aug. 10, 2012, 3 pages.
Preliminary Amendment filed Jun. 13, 2016 from U.S. Appl. No. 14/281,885, 8 pages.
Notice of Allowance mailed Aug. 12, 2016 from U.S. Appl. No. 14/281,885, 81 pages.
Response filed Jul. 11, 2016 from China Patent Application No. 2012100376665, 15 pages.
Notice of Allowance mailed Jun. 22, 2016 from U.S. Appl. No. 13/891,116, 68 pages.
Response filed Jun. 29, 2016 to the Non-Final Office Action mailed Mar. 29, 2016 from U.S. Appl. No. 14/037,986, 12 pages.
Non-Final Office Action mailed Jul. 24, 2015 from U.S. Appl. No. 13/585,606, 42 pages.
Response filed Oct. 26, 2015 to the Non-Final Office Action mailed Jul. 24, 2015 from U.S. Appl. No. 13/585,606, 14 pages.
Final Office Action mailed Jan. 15, 2016 from U.S. Appl. No. 13/585,606, 12 pages.
Response filed Apr. 13, 2016 to the Final Office Action mailed Jan. 15, 2016 from U.S. Appl. No. 13/585,606, 11 pages.

(56) References Cited

OTHER PUBLICATIONS

Non-Final Office Action mailed Jun. 16, 2016 from U.S. Appl. No. 13/585,606, 12 pages.
International Preliminary Report on Patentability mailed Feb. 17, 2015 from PCT Patent Application No. PCT/US2013/053878, 7 pages.
Final Office Action mailed Sep. 8, 2016 from U.S. Appl. No. 14/037,986, 29 pages.
International Search Report and Written Opinion mailed Aug. 25, 2016 from PCT Patent Application No. PCT/US2016/032949, 16 pages.
Response filed Sep. 16, 2016 to the Non-Final Office Action mailed Jun. 16, 2016 from U.S. Appl. No. 13/585,606, 12 pages.
Billinghurst et al., "Collaborative Augmented Reality," Communications of the ACM, vol. 45, No. 7, Jul. 1, 2002, pp. 64-70, 7 pages.
Response filed Oct. 19, 2016 to the International Search Report and Written Opinion mailed Aug. 25, 2016 from PCT Patent Application No. PCT/US2016/032949, 7 pages.
Terminial Disclaimer mailed Jun. 13, 2016 from U.S. Appl. No. 14/281,885, 5 pages.
Non-Final Office Action mailed Aug. 12, 2016 from U.S. Appl. No. 14/742,458, 37 pages.
Response filed Sep. 27, 2016 to the Non-Final Office Action mailed Aug. 12, 2016 from U.S. Appl. No. 14/742,458, 12 pages.
Final Office Action mailed Dec. 12, 2016 from U.S. Appl. No. 14/742,458, 122 pages.
Notice on Grant mailed Oct. 28, 2016 from China Patent Application No. 201210037666.5, 7 pages.

\* cited by examiner

LOCATIONAL NODE DEVICE

BACKGROUND

Modern multimedia environments are traditionally anchored to a multimedia device, such as a gaming console, stereo console or component, set-top box, etc. In some circumstances, the multimedia device is embodied in a stand-alone console connected to a television or a computer system with a graphical display and/or sound system. In other circumstances, the multimedia device is embodied in a mobile device, which operates as a gaming console. Nevertheless, the multimedia experience (e.g., gaming) is geographically constrained to a location associated with the console—either the player moves to the proximity of the console and or the console moves with the player. However, multimedia environments need not be anchored so tightly to the geographical proximity of the multimedia consoles.

SUMMARY

Implementations described and claimed herein address the foregoing problems by providing a node device for use in a distributed virtual environment, wherein the node device captures locational signals projected by another node device into a capture area of the node device and reflected from the capture area to a capture device of the node device. The location of the node device relative to the other node device is determined based on the captured locational signals. The determined location can be based on an angular relationship determined between the node device and the other node device based on the captured locational signals. The determined location can also be based on a relative distance determined between the node device and the other node device based on the captured locational signals. Topology of the capture area can also be detected by the node device, and topologies of multiple capture areas can be combined to define one or more surfaces in a virtual environment.

In some implementations, articles of manufacture are provided as computer program products. One implementation of a computer program product provides a tangible computer program storage medium readable by a computing system and encoding a processor-executable program. Other implementations are also described and recited herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
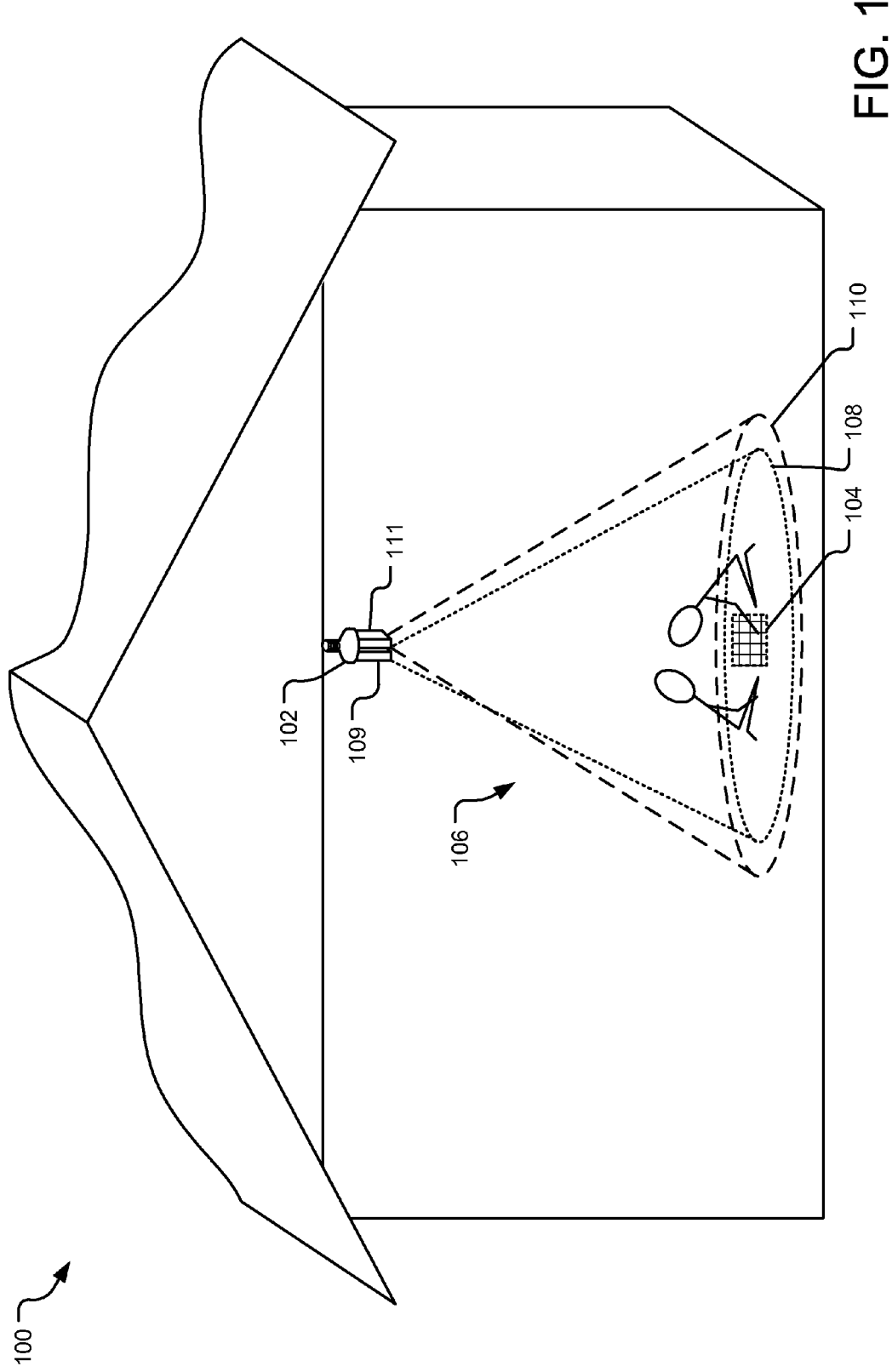
FIG. 1 illustrates an example multimedia environment including a node device.

FIG. 1 illustrates an example multimedia environment 100 including a node device 102. The multimedia environment 100 is extended from the proximity of a multimedia console (not shown), such as a gaming console, by virtue of the node device 102, which, for example, is capable of projecting aspects of a game (e.g., a projected, virtual board game 104 and associated audio) into a play area 106 of the multimedia environment 100.

As illustrated in FIG. 1, the play area 106 includes a projection area 108 associated with a projection device 109 and a capture area 110 associated with a capture device 111. It should be understood that, although the capture area 110 is depicted as concentric with and having a larger diameter than the projection area 108, the sizes and positions of the areas 110 and 108 need not be interdependent. In one implementation, the projection area 108 and the capture area 110 may be concentric and have the same diameters. In another implementation, either area can have a larger diameter than the other area. In yet other implementations, the projection area 108 and the capture area 110 need not be concentric, need not be circular, and need not be overlapping. Furthermore, although the projection area 108 and the capture area 110 are described herein as "areas," it should be understood that the projection and the monitoring associated with these areas can operate throughout the volumes occupied within the field of view of the projection device 109 and the capture device 111, respectively.

The node device 102 represents a node in a network including one or more other node devices (not shown), although the node device 102 may alternatively be used in a stand-alone mode. In addition, one or more multimedia consoles may also be communicatively coupled to the network. In this manner, the network of nodes may be distributed throughout the multimedia environment 100 to extend the gaming experience beyond the proximity of a multimedia console. For example, consider that a multimedia console is located in a different room of the house than the node device 102. Accordingly, the node device 102 can create the play area 106 in a different room than the console.

As shown, the node device 102 includes a standard light bulb interface and screws in to a standard light bulb fixture. The node device 102 is supplied electrical power from the house's electrical power grid through the light bulb fixture, although battery, solar, or other power may be supplied to the node device 102. Furthermore, in one implementation, the node device 102 communicates via a power line networking protocol with a multimedia console and other node devices in the network. In alternative implementations, the node device 102 can communicate with the multimedia console and other node devices via other networking protocols including without limitation Wi-Fi, wired Ethernet, etc. In this manner, the multimedia environment 100 associated with the multimedia console may be distributed throughout the house or other structure.

The various node devices operate to project aspects of the multimedia environment 100 onto surfaces or into volumes within the structure and to monitor player movement and other structures within the multimedia environment 100. Based on the projection output and the monitored input, the multimedia console can integrate the multimedia environment 100 into a virtual multimedia environment that allows users (e.g., players) to interact with the multimedia environment 100 (e.g., a gaming environment) and with each other.

Figure 2:
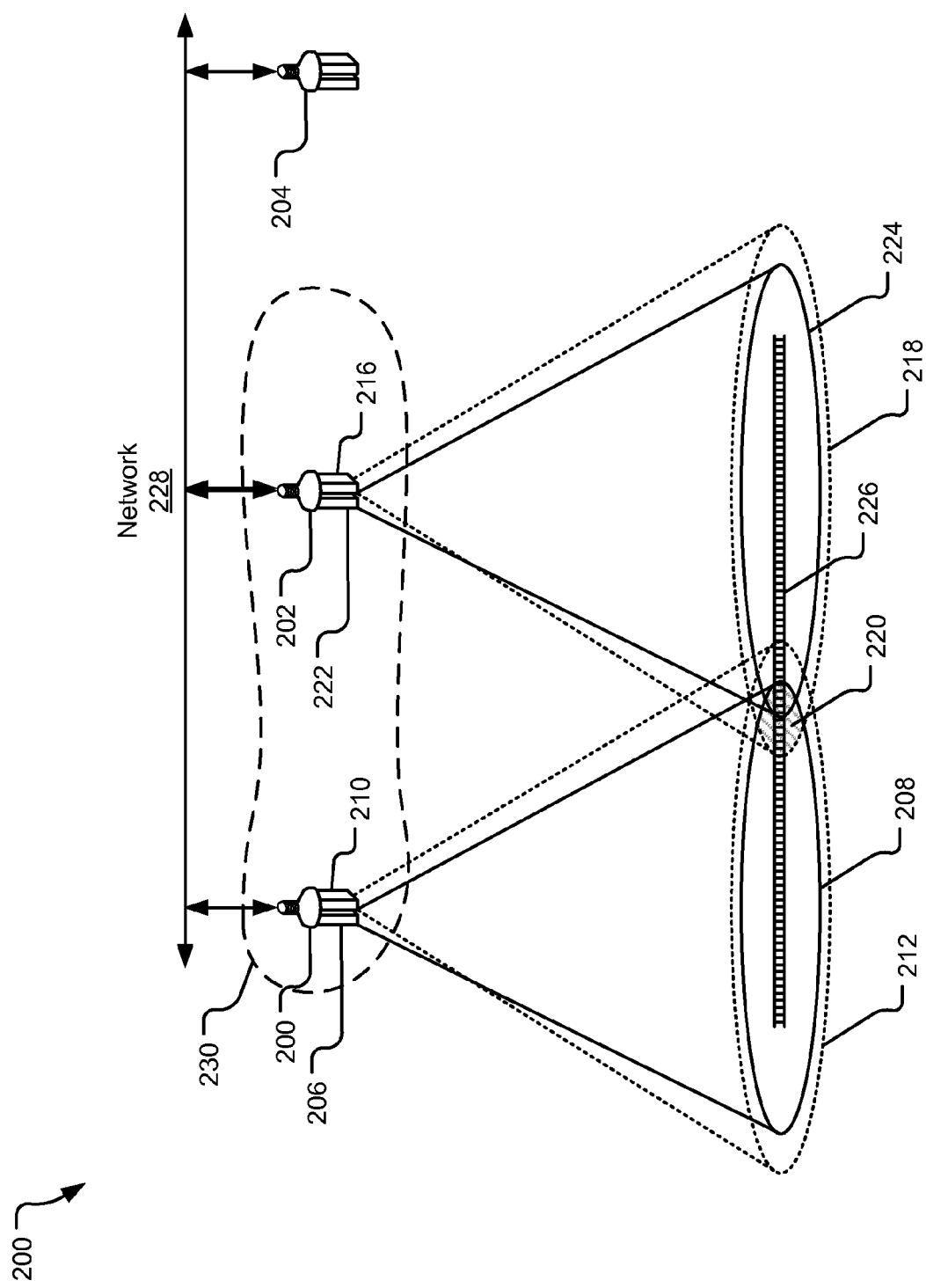
FIG. 2 illustrates three example node devices, with two node devices operating to self-locate relative to each other.

FIG. 2 illustrates three example node devices 200, 202, and 204, with the two node devices 200 and 202 operating to self-locate relative to each other. In some implementations, the node device 200 includes a projection device 206 that projects light (whether visible or invisible), sound, etc. (collectively, "projected signals") into a projection area 208 and a capture device 210 that monitors the light (whether visible or invisible), sound, etc. (collectively, "captured signals") reflected from a capture area 212. For example, projected light can take many different forms including structured light, scanned laser light, visible (e.g., red-green-blue or RGB) light, invisible (e.g., infrared or IR) light, etc. In another implementation, the projection device 206 projects signals that can be captured by the capture device 210. In either implementation, the capture device 210 are configured to capture signals with depth information including a depth image having depth values via any suitable technique including, for example, time-of-flight, structured light, stereo image, etc. It should also be understood that either or both of the projection device 206 and the capture device 210 may be configured to operate in multiple modes (e.g., dual visible light and IR projection and/or capture).

The node device 202 includes a capture device 216 capable of detecting signals (e.g., visible light, invisible light, acoustic waves, etc.) projected by the projection device 206 of the node device 200 and reflected from the capture area of the node device 202. Accordingly, the node device 202 can capture a signal generated by the node device 200 that can be used to determine the location of the node device 202 relative to the node device 200. For example, during a self-locating process, the node device 200 can project a light pattern into the projection area 208, which can be detected in a capture area 218 by the node device 202. A region of overlap between the projection area 208 and the capture area 218 is shown with cross-hatching as an overlap region 220.

The projected signal of the node device 200 is known to the node device 202 and has characteristics that allow the node device 202 to determine its location relative to the node device 200. For example, in one implementation, the projected signal includes angularly unique coordinates discernible by the capture device 216. By analyzing the coordinates contained within the overlap region 220, the node device 202 can determine which portion of the circular arc of the projection area 208 is included within the overlap region 220 and, therefore, determining the angular relationship between the node device 200 and the node device 202. Further, the node device 202 can determine the distance between itself and the node device 200 by analyzing the portion of the coordinates within the overlap region 220. Moreover, the node device 202 can determine its relative distance from the surface of the capture area 218 as compared to the distance of the distance between the node device 200 and the projection are 208 by comparing the depth information captured by the node device 200 and the node device 202.

In one implementation, the node device 200 self-calibrates. For example, when the node device 200 is implemented to project structured light or a patterned image, the projection device 206 is calibrated with the capture device 210 using a known pattern projected and captured on a known surface at a known distance to allow the projected pattern to be remapped onto the capture device 210. In this manner, the projection device 206 and the capture device 210 of the node device 200 are calibrated with respect to each other. As such, the node device 200 can detect irregularities (e.g., non-planar regions) in the surface of the projection area 208 and capture area 212. However, the node device 200 can be calibrated using other techniques.

The node device 202 also includes a projection device 222 that projects a signal into a projection area 224. Both the projection device 206 and the projection device 222 are capable of projecting visual aspects of the game environment enter their respective projection areas 208 and 224. For example, the projection device 206 can project a virtual train track 226 within its projection area 208 that can be continued by the projection device 222 within its projection area 224. A player can interact with the associated train game by using gestures captured by the capture devices 210 and 216 to add cars to a virtual train projected onto the train track 226.

When the node device 202 initiates and attempts to determine its relative location and orientation as compared to other node devices, the node device 202 interacts with the other node devices in a manner similar to self-calibration. For example, when the node device 200 is projecting a known pattern into the projection area 208, the node device 202 captures a portion of the projection area 208 (e.g., the overlapping region 220). The known pattern may be predefined for both node devices or otherwise shared between each node, such as via a network 228. (In one implementation, the known pattern is projected using non-visible wavelengths. In other implementation, the known pattern is projected during a special calibration or locating phase, which may be a dedicated phase of operation or a designated time slot in a periodic sequence of time slots.) In an implementation employing a time-of-flight depth sensor and structure light, the structured light and time-of-flight modulated signals may be interleaved as they are projected by a projection device or separate projection devices may be employed.

As such, the node device 202 knows the projected pattern during this location determination mode, and from the portion of the projected pattern captured by the node device 202, the node device 202 can determine its position (e.g., using spatial correlation) with respect to the node device 200. By this method, the node devices 200 and 202 can determine a vector (e.g., angle and distance) between them, resulting in relative self-location. However, the node devices can alternatively self-locate using other techniques.

The node devices 200, 202, and 204 are communicatively coupled with each other via the network 228, which can also communicatively couple with one or more multimedia consoles (not shown). Although the network 228 is shown as a wired network, the network 228 can be wired or wireless or a combination of both. However, as illustrated in FIG. 2, the node device 204 has not yet self-located and entered the multimedia environment. As such, the node devices 200 and 202 are operating as cooperating members of a target recognition, analysis and tracking system 230 (including potentially one or more multimedia consoles) to provide an interactive multimedia environment, while the node device 204 has not yet gained membership into this multimedia environment.

It should be understood that other sensors may be used combined with the node devices, including pressure mats (in various surfaces of the multimedia environment), microphones, thermal sensors, etc. in the multimedia environment. By fusing these various inputs, the multimedia environment can capture a rich variety of inputs and thereby enhance the multimedia experience. In some implementation, the capture device can adjust according to the reflectance of the projection surface or areas thereof so as to smooth the projected image in on project image and to reduce seams and transitions between different projection images.

It should also be understood that projection areas and capture areas, while illustrated as circular, may take different shapes, and therefore may be square, rectangular, triangular, oval, etc. Further, the projection areas and captures areas of different node devices, as well as of a single node device, may have different shapes. In addition, the projection area and capture area of a node device may dynamically change over time (e.g., to be narrowed or widened or to change the shape of an area), such as to optimize overlap, using various optical and mechanical means.

Figure 3:
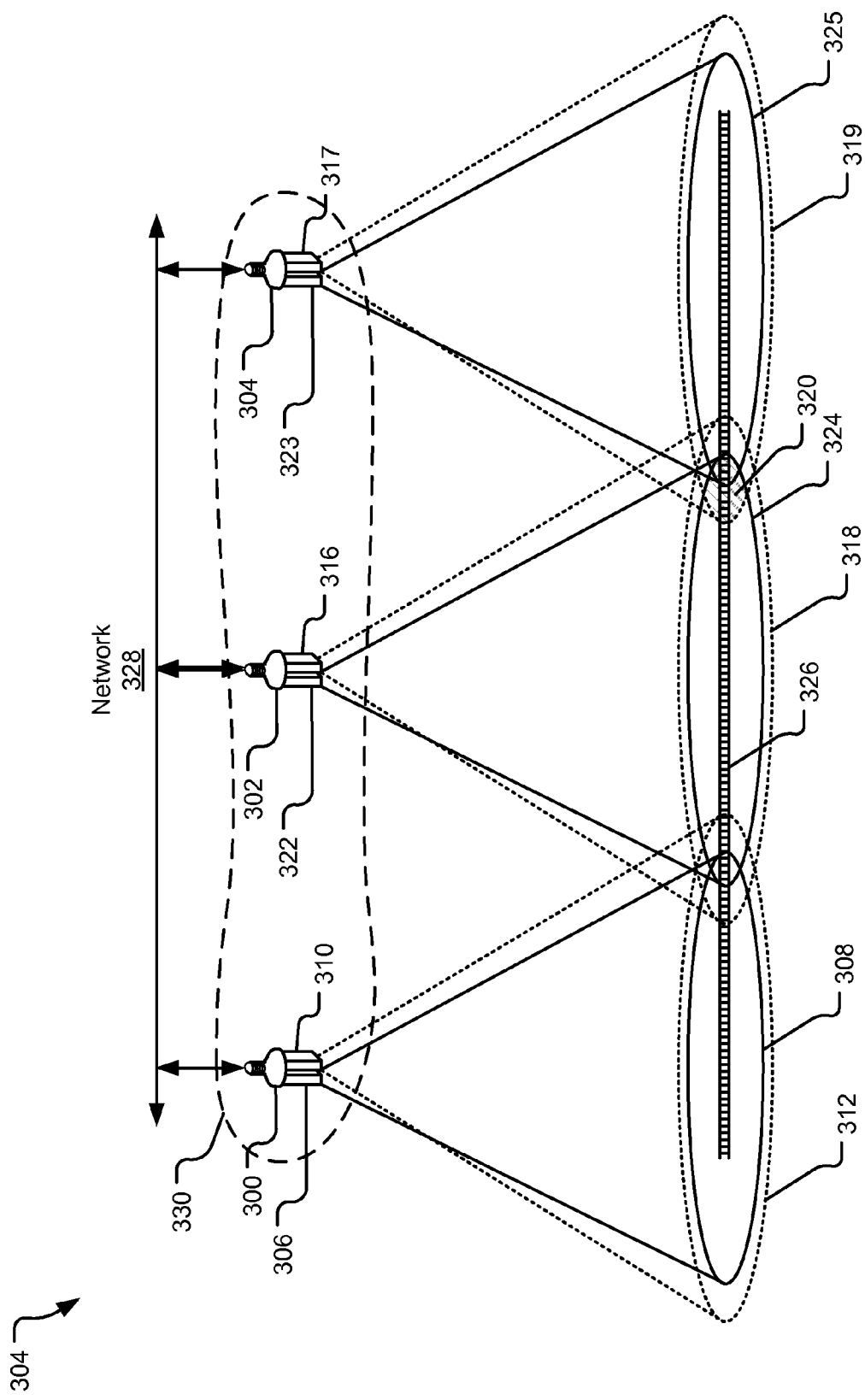
FIG. 3 illustrates three example node devices, with each of the three node devices operating to self-locate relative to each other.

FIG. 3 illustrates three example node devices 300, 302, and 304, with each with three node devices operating to self-locate relative to each other. In some implementations, the node devices 300, 302, and 304 include projection devices 306, 322, and 323 that project signals into their respective projection areas 308, 324, and 325 and capture devices 310, 316, and 317 that monitor and capture the signals reflected from their respective capture areas 312, 318, and 319. In either implementation, the capture devices 310, 316, and 317 are configured to capture signals with depth information including a depth image having depth values via any suitable technique including, for example, time-of-flight, structured light, stereo image, etc.

In a manner similar to that discussed with regard to FIG. 2, the node device 304 includes the capture device 317, which is capable of detected signal (e.g., visible light, invisible light, acoustic waves, etc.) projected by the projection device 322 of the node device 302. Accordingly, the node device 304 can capture a signal generated by the node device 302 that can be used to determine the location of the node device 304 relative to the node device 302.

The node device 304 also includes a projection device 323 that projects a signal into a projection area 324. The projection devices 306, 322, and 323 are capable of projecting visual aspects of the game environment enter their respective projection areas 308, 324, and 325. For example, the projection device 306 can project a virtual train track 326 within its projection area 308 that can be continued by the projection device 322 within its projection area 324 and by the projection device 323 within its projection area 325. A player can interact with the associated train game by using gestures captured by the capture devices 310, 316, and 317 to add cars to a virtual train projected onto the train track 326.

The node devices 300, 302, and 304 are communicatively coupled with each other via a network 328, which can also communicatively couple with one or more multimedia consoles (not show). Although the network 328 is shown as a wired network, the network 328 can be wired or wireless or a combination of both. The node devices 300, 302, and 304 are operating as cooperating members of a target recognition, analysis and tracking system 330 (including one or more multimedia consoles) to provide an interactive multimedia environment.

Figure 4:
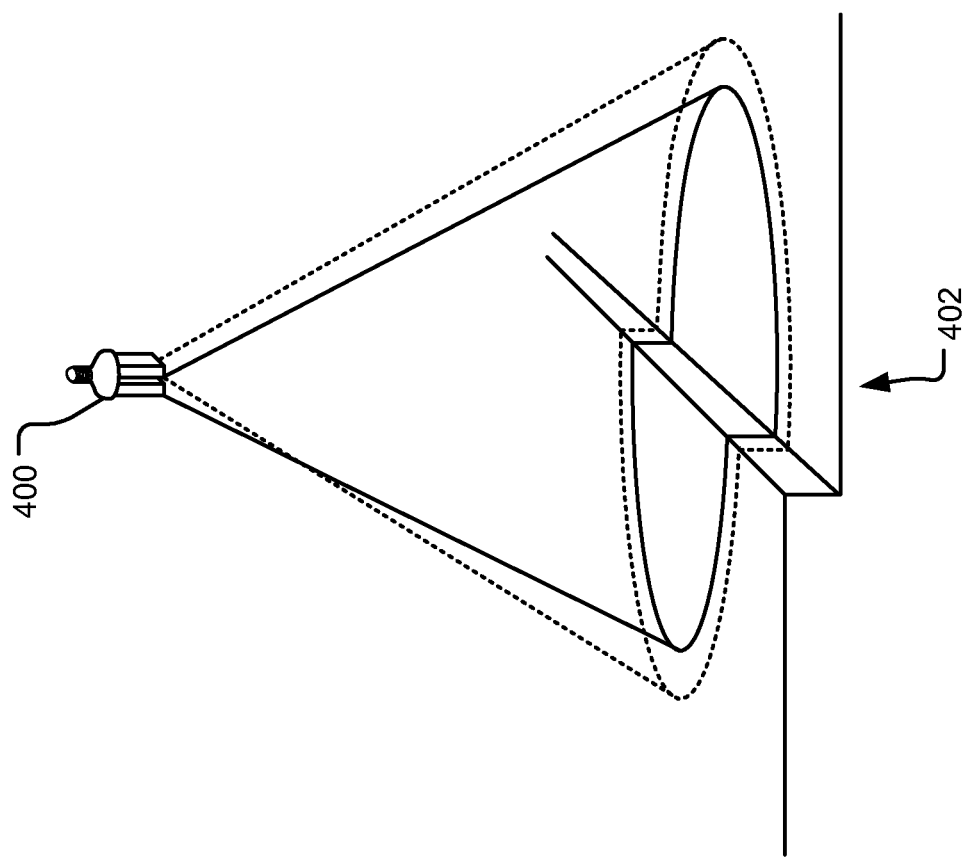
FIG. 4 illustrates an example node device projecting and capturing with respect to an irregular surface.

FIG. 4 illustrates an example node device 400 projecting and capturing with respect to an irregular surface 402. Examples of irregularities may include without limitation non-planar surfaces and surfaces having points in the capture area that are not equidistant from the node device 400. The signal projected by the node device 400 onto the surface 402 is known. As previously described, the node device 400 may be calibrated relative to a known projected signal on a known surface and at a known distance. Accordingly, the signal reflected by the surface 402 and captured by the node device 400 can be compared to the known projected signal to determine any variation (e.g., in terms of topography and distance) of the surface as compared to the known surface used during self-calibration (e.g., a planar surface orthogonal to the center axis of the projection device of the node device 400). Based on this analysis, the node device 400 and the gaming system with which it interacts can adjust gaming projections and captures to account for irregularities in the multimedia environment. For example, projection of a virtual road across the step in the surface 402 may be adjusted to project a bridge or ramp, thereby providing a more realistic road layout to accommodate the irregularity introduced by the step.

Figure 5:
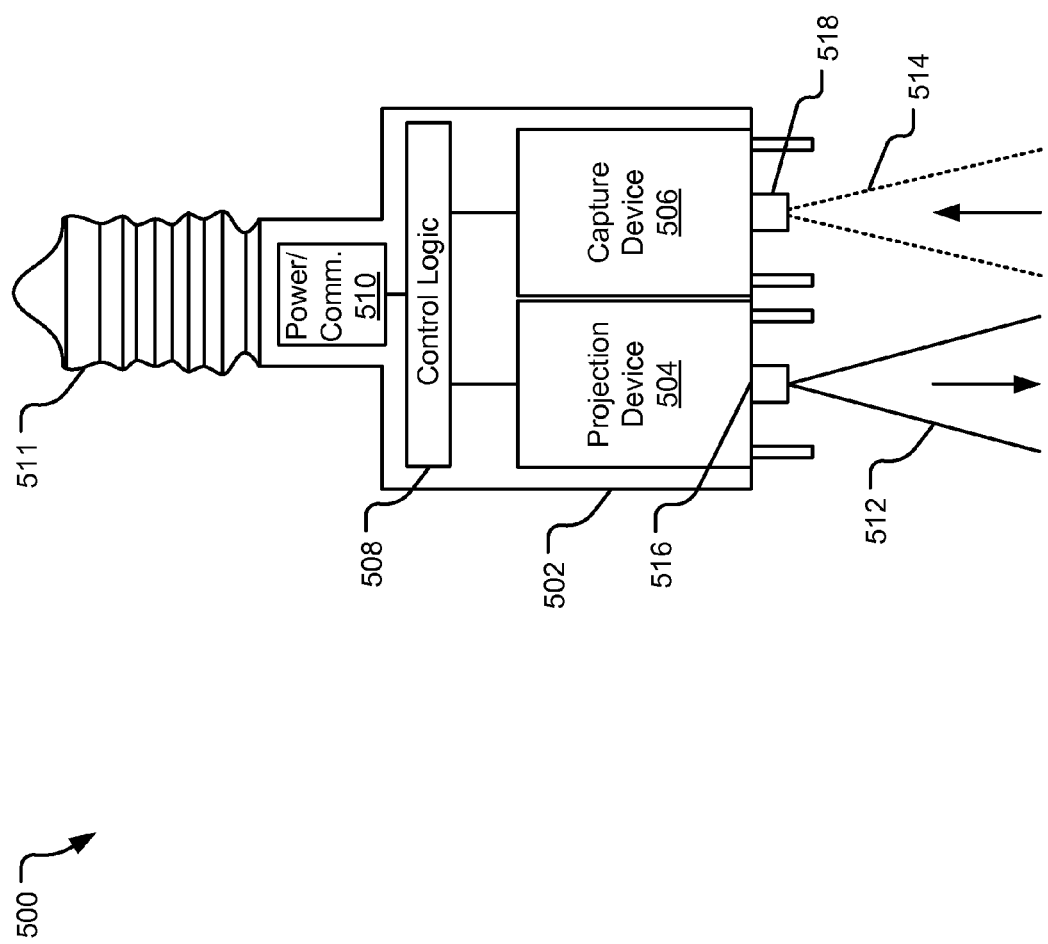
FIG. 5 illustrates an example implementation of a node device.

FIG. 5 illustrates an example implementation of a node device 500. A device housing 502 encloses a projection device 504, a capture device 506, and supporting components. Although they are shown as separate devices, it should be understood that the projection device 504 and the capture device 506 (as well as other components of the node device 500) may be integrated into a single component. The projection device 504 and the capture device 506 are communicatively coupled to control logic 508, which controls the projected signals generated by the projection device 504 and the capture activity performed by the capture device 506. A power/communication circuit 510 receives electrical power from a power supply, such as from a power line connected to the power coupling 511, a battery, etc., and performs transmission and/or reception of communications via a network that interconnects various nodes and console(s) in the multimedia environment. The control logic 508 can also perform the self-locating computations of the node device 500 or some of all of these computations may be off-loaded to one or more other nodes or consoles communicatively coupled to the network.

The projection device 504 of the node device 500 projects signals into a projection field 512, which are directed from an outlet 516 into a projection area on one or more surfaces opposite the projection device 504. The capture device 506 of the node device 500 captures signals received within a capture field 514 through an inlet 518, which are reflected from a capture area on one or more surfaces opposite the capture device 504. The projected signals may include visible and/or invisible light, acoustic waves, etc. and may be projected as a part of a game or other multimedia experience. The projected signals may also include visible and/or invisible light, acoustic waves, etc. and may capture gestures and other movements as a part of a game or other multimedia experience.

Figure 6:
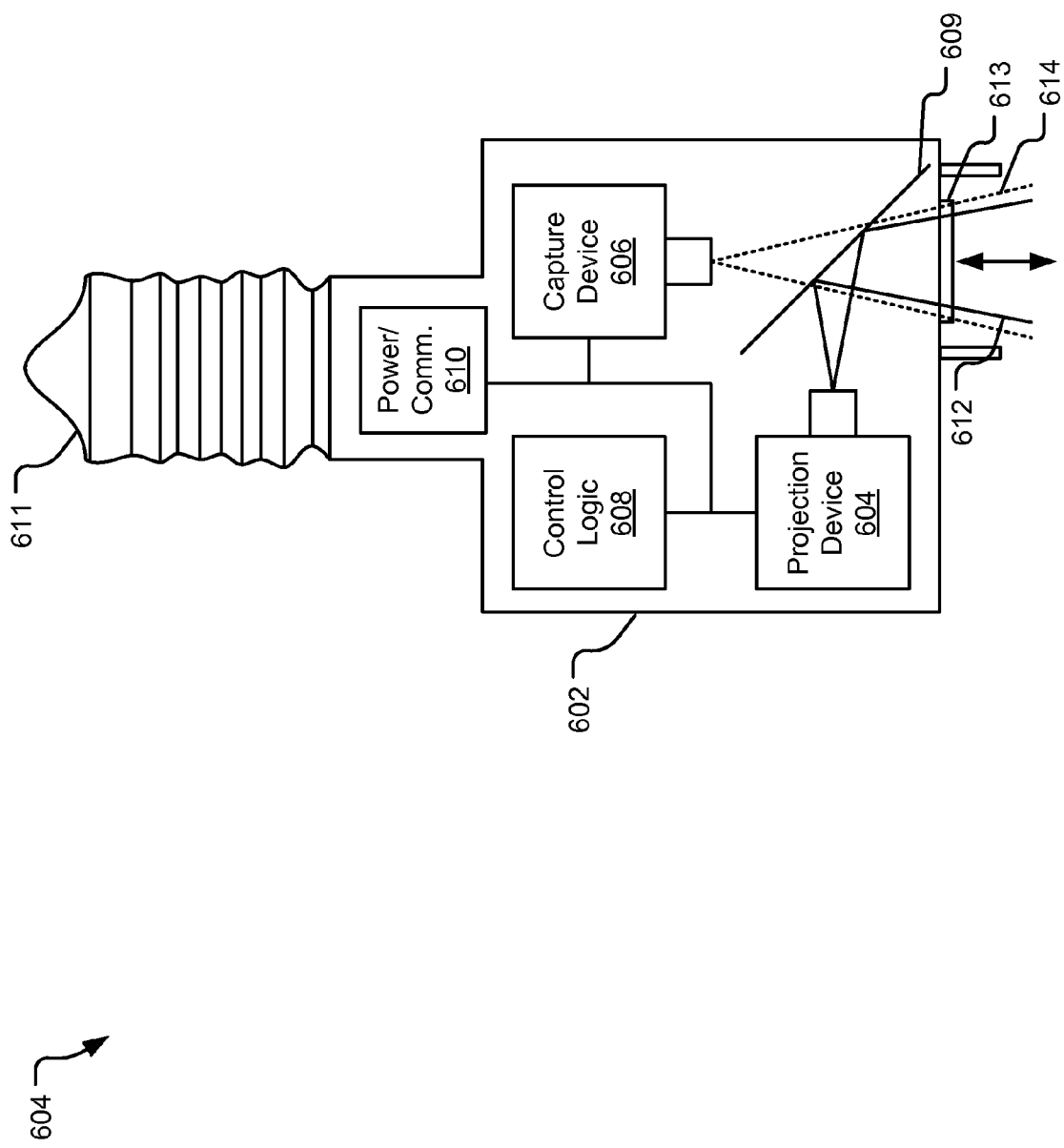
FIG. 6 illustrates another example implementation of a node device.

FIG. 6 illustrates another example implementation of a node device 600. A device housing 602 encloses a projection device 604, a capture device 606, and supporting components. Although they are shown as separate devices, it should be understood that the projection device 604 and the capture device 606 (as well as other components of the node device 600) may be integrated into a single component. The projection device 604 and the capture device 606 are communicatively coupled to control logic 608, which controls the projected signals generated by the projection device 604 and the capture activity performed by the capture device

606. A power/communication circuit 610 receives electrical power from a power supply, such as from a power line connected to the power coupling 611, a battery, etc., and performs transmission and/or reception of communications via a network that interconnects various nodes and console(s) in the multimedia environment. The control logic 608 can also perform the self-locating computations of the node device 600 or some of all of these computations may be off-loaded to one or more other nodes or consoles communicatively coupled to the network.

The projection device 604 of the node device 600 projects signals to a beam splitter 609, which directs the projected device to a projection field 612. Accordingly, the projected signals are directed through an opening 613 to a projection area on one or more surfaces opposite the opening 613. The capture device 606 of the node device 600 captures signals within a capture field 614, wherein the captured signals are reflected through the opening 613 and the beam splitter 609 from a capture area on one or more surfaces opposite the opening 613. The projected signals may include visible and/or invisible light, acoustic waves, etc. and may be projected as a part of a game or other multimedia experience. The projected signals may also include visible and/or invisible light, acoustic waves, etc. and may capture gestures and other movements as a part of a game or other multimedia experience.

Figure 7:
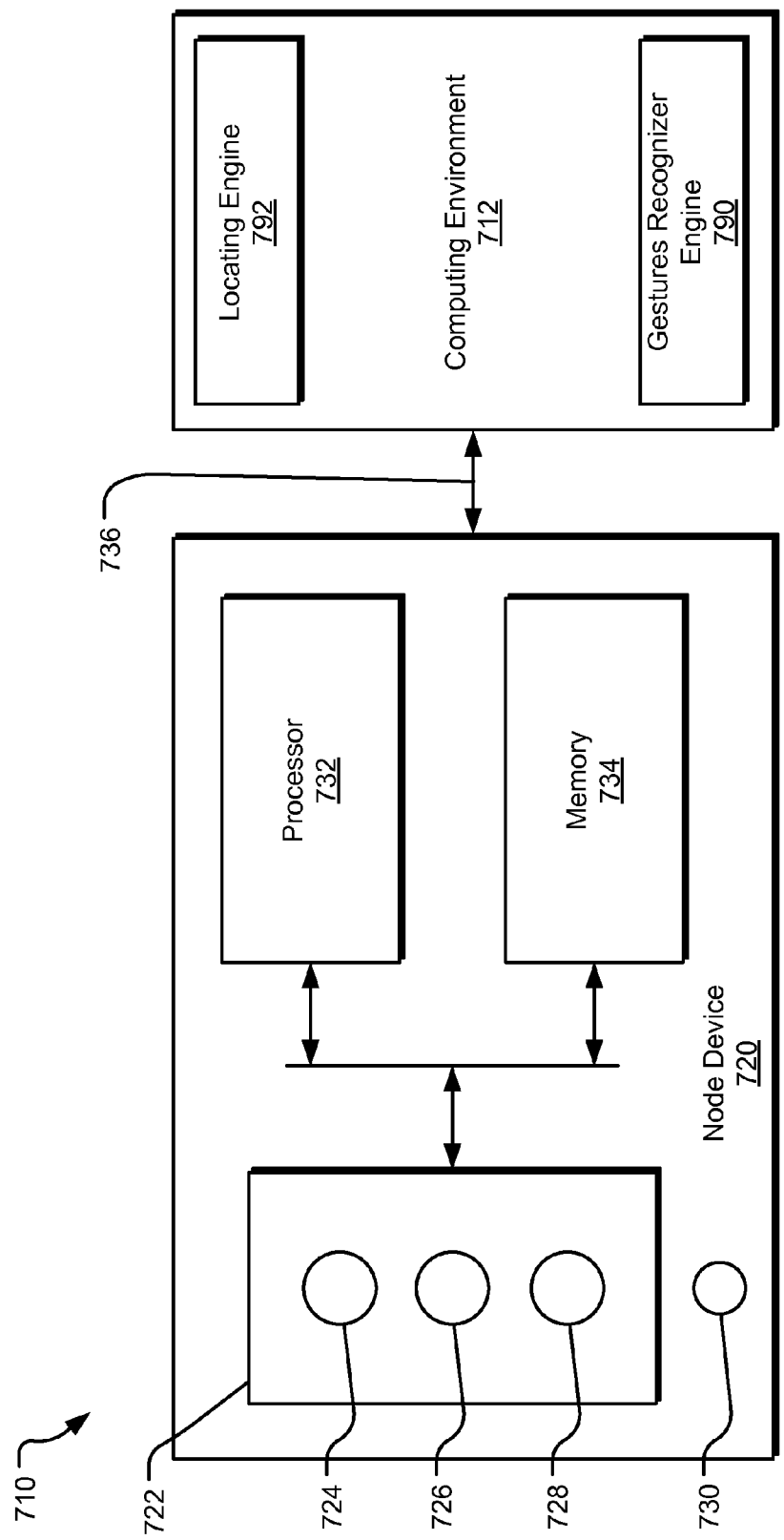
FIG. 7 illustrates an example of implementation of a capture device that may be used in a target recognition, analysis and tracking system.

FIG. 7 illustrates an example of implementation of a node device 720 that may be used in a target recognition, analysis and tracking system 710. According to the example implementation, the node device 720 may be configured to capture video with depth information including a depth image that may include depth values via any suitable technique including, for example, time-of-flight, structured light, stereo image, or the like. According to one implementation, the node device 720 organizes the calculated depth information into "Z layers," or layers that are perpendicular to a Z-axis extending from the depth camera along its line of sight, although other implementations may be employed.

As shown in FIG. 7, the node device 720 may include an image camera component 722. According to an example implementation, the image camera component 722 includes a depth camera that captures the depth image of a scene. An example depth image includes a two-dimensional (2-D) pixel area of the captured scene, where each pixel in the 2-D pixel area may represent a distance of an object in the captured scene from the camera.

As shown in FIG. 7, the image camera component 722 includes an IR light component 724, a three-dimensional (3-D) camera 726, and an RGB camera 728. For example, in time-of-flight analysis, the IR light component 724 of the node device 720 emits an infrared light onto the scene and then uses sensors (not shown) to detect the backscattered light from the surface of one or more targets and objects in the scene using, for example, the 3-D camera 726 and/or the RGB camera 728. In some embodiments, pulsed infrared light may be used such that the time between an outgoing light poles and a corresponding incoming light pulse may be measured and used to determine a physical distance from the node device 720 to particular locations on the targets or objects in the scene. Additionally, in other example implementations, the phase of the outgoing light wave may be compared to the phase of the incoming light wave to determine a phase shift. The phase shift may then be used to determine a physical distance from the node device 720 to particular locations on the targets or objects in the scene.

According to another example implementation, time-of-flight analysis may be used to directly determine a physical distance from the node device 720 to particular locations on the targets and objects in a scene by analyzing the intensity of the reflected light beam over time via various techniques including, for example, shuttered light pulse imaging In another example implementation, the node device 720 uses a structured light to capture depth information. In such an analysis, patterned light (e.g., light projected as a known pattern, such as a grid pattern or a stripe pattern) is projected on to the scene via, for example, the IR light component 724. Upon striking the surface of one or more targets or objects in the scene, the pattern may become deformed in response. Such a deformation of the pattern is then captured by, for example, the 3-D camera 726 and or the RGB camera 728 and analyzed to determine a physical distance from the capture device to particular locations on the targets or objects in the scene.

According to another example implementation, the node device 720 includes two or more physically separate cameras that view a scene from different angles to obtain visual stereo data that may be resolved to generate depth information.

The node device 720 may further include a microphone 730, which includes a transducer or sensor that receives and converts sound into an electrical signal. According to one example implementation, the microphone 730 is used to reduce feedback between the node device 720 and a computing environment 712 in the target recognition, analysis, and tracking system 710. Additionally, the microphone 730 may be used to receive audio signals provided by the user to control applications, such as game occasions, non-game applications, etc. that may be executed in the computing environment 712, such as a multimedia console.

In an example implementation, the node device 720 further includes a processor 732 in operative communication with the image camera component 722. The processor 732 may include a standardized processor, a specialized processor, a microprocessor, etc. that executes processor-readable instructions, including without limitation instructions for receiving the depth image, determining whether a suitable target may be included in the depth image, converting the suitable target into a skeletal representation or model of the target, or any other suitable instructions.

The node device 720 may further include a memory component 734 that stores instructions for execution by the processor 732, images and/or frames of images captured by the 3-D camera or RGB camera, or any other suitable information, images, etc. According to an example implementation, the memory component 734 may include random access memory (RAM), read-only memory (ROM), cache memory, Flash memory, a hard disk, or any other suitable storage component. As shown in FIG. 2, in one implementation, the memory component 734 may be a separate component in communication with the image capture component 722 and the processor 732. According to another implementation, the memory component 734 may be integrated into the processor 732 and/or the image capture component 722.

Additionally, the node device 720 provides the depth information and images captured by, for example, the 3-D camera 726 and or the RGB camera 728, and a skeletal model that is generated by the node device 720 to the computing environment 712 via a communication link 736, such as a wired or wireless network link. The computing environment 712 then uses the skeletal model, depth information, and captured images to, for example, recognize user gestures and in response control an application, such as a game or word processor. For example, as shown in FIG. 7, the computing environment 712 includes gestures recognizer engine 790. The gestures recognizer engine 790 includes a collection of gesture filters, each comprising information concerning a gesture that may be performed by the skeletal model (as the user moves). The data captured by the cameras 726, 728, and the node device 720 in the form of the skeletal model and movements associated with it may be compared to the gesture filters and the gestures recognizer engine 790 to identify when a user (as represented by the skeletal model) has performed one or more gestures. These gestures may be associated with various controls of an application. Thus, the computing environment 712 can use the gestures recognizer engine 790 to interpret movements of the skeletal model and to control an application based on the movements.

As previously discussed, while the node device 720 may perform at least some aspects of the self-locating functionality, it should be understood that all or a portion of the self-locating computations may be performed by the computing environment, such as in a locating engine 792.

Figure 8:
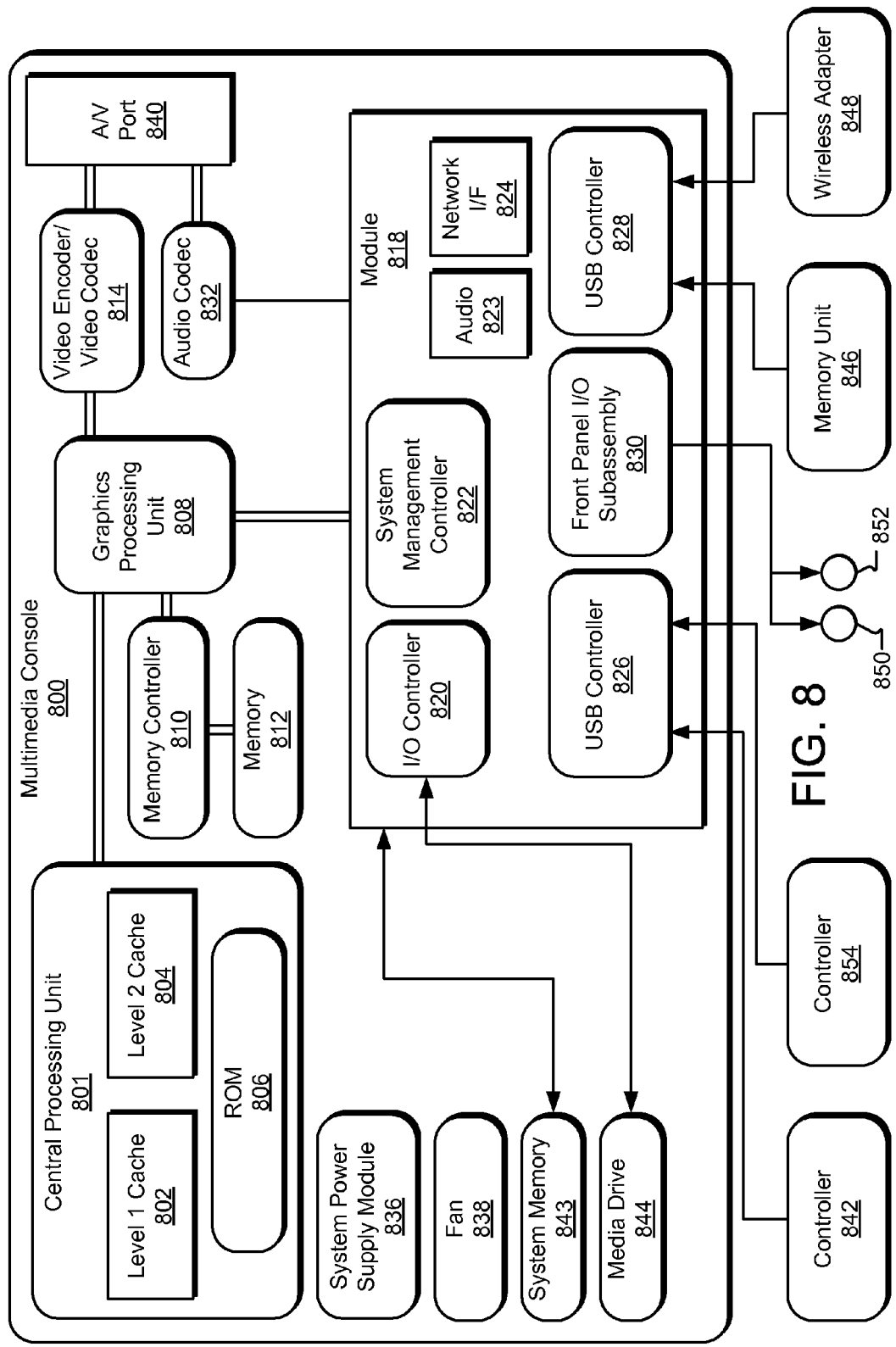
FIG. 8 illustrates an example implementation of a computing environment that may be used to interpret one or more gestures in a target recognition, analysis and tracking system.

FIG. 8 illustrates an example implementation of a computing environment that may be used to interpret one or more gestures in a target recognition, analysis and tracking system. The computing environment may be implemented as a multimedia console 800, such as a multimedia console. The multimedia console 800 has a central processing unit (CPU) 801 having a level 1 cache 802, a level 2 cache 804, and a flash ROM (Read Only Memory) 806. The level 1 cache 802 and the level 2 cache 804 temporarily store data, and hence reduce the number of memory access cycles, thereby improving processing speed and throughput. The CPU 801 may be provided having more than one core, and thus, additional level 1 and level 2 caches. The flash ROM 806 may store executable code that is loaded during an initial phase of the boot process when the multimedia console 800 is powered on.

A graphical processing unit (GPU) 808 and a video encoder/video codec (coder/decoder) 814 form a video processing pipe line for high-speed and high-resolution graphics processing. Data is carried from the GPU 808 to the video encoder/video codec 814 via a bus. The video-processing pipeline outputs data to an A/V (audio/video) port 840 for transmission to a television or other display. The memory controller 810 is connected to the GPU 808 to facilitate processor access to various types of memory 812, such as, but not limited to, a RAM (Random Access Memory).

The multimedia console 800 includes an I/O controller 820, a system management controller 822, and audio processing unit 823, a network interface controller 824, a first USB host controller 826, a second USB controller 828 and a front panel I/O subassembly 830 that are implemented in a module 818. The USB controllers 826 and 828 serve as hosts for peripheral controllers 842 and 854, a wireless adapter 848, and an external memory 846 (e.g., flash memory, external CD/DVD drive, removable storage media, etc.). The network interface controller 824 and/or wireless adapter 848 provide access to a network (e.g., the Internet, a home network, etc.) and may be any of a wide variety of various wired or wireless adapter components, including an Ethernet card, a modem, a Bluetooth module, a cable modem, and the like.

System memory 843 is provided to store application data that is loaded during the boot process. A media drive 844 is provide in may come prize a CD/DVD drive, hard drive, or other removable media drive, etc. the media drive 844 may be internal or external to the multimedia console 800. Application data may be accessed via the media drive 844 for execution, playback, etc. by the multimedia console 800. The media drive 844 is connected to the I/O controller 820 via a bus, such as a serial ATA bus or other high-speed connection (e.g., IEEE 1394).

The system management controller 822 provides a variety of service function related to assuring availability of the multimedia console 800. The audio processing unit 823 and an audio codec 832 form a corresponding audio processing pipeline with high fidelity and stereo processing. Audio data is carried between the audio processing unit 823 and the audio codec 832 via a communication link. The audio processing pipeline outputs data to the A/V port 840 for reproduction by an external audio player or device having audio capabilities.

The front panel I/O sub assembly 830 supports the functionality of the power button 850 and the eject button 852, as well as any LEDs (light emitting diodes) or other indicators exposed on the outer surface of the multimedia console 800. A system power supply module 836 provides power to the components of the multimedia console 800. A fan 838 cools the circuitry within the multimedia console 800.

The CPU 801, GPU 80 the memory controller 810, and various other components within the multimedia console 800 are interconnected via one or more buses, including serial and parallel buses, a memory bus, a peripheral bus, and a processor or local bus using any of a variety of bus architectures. By way of example, such bus architectures may include without limitation a Peripheral Component Interconnect (PCI) bus, a PCI-Express bus, etc.

When the multimedia console 800 is powered on, application data may be loaded from the system memory 843 into memory 812 and/or caches 802, 804 and executed on the CPU 801. The application may present a graphical user interface that provides a consistent user interface when navigating to different media types available on the multimedia console 800. In operation, applications and/or other media contained within the media drive 844 may be launched and/or played from the media drive 844 to provide additional functionalities to the multimedia console 800.

The multimedia console 800 may be operated as a standalone system by simply connecting the system to a television or other display. In the standalone mode, the multimedia console 800 allows one or more users to interact with the system, watch movies, or listen to music. However, with the integration of broadband connectivity made available through the network interface 824 or the wireless adapter 848, the multimedia console 800 may further be operated as a participant in a larger network community.

When the multimedia console 800 is powered on, a defined amount of hardware resources are reserved for system use by the multimedia console operating system. These resources may include a reservation of memory (e.g., 16 MB), CPU and GPU cycles (e.g., 5%), networking bandwidth (e.g., 8 kb/s), etc. Because the resources are reserved at system boot time, the reserve resources are not available for the application's use. In particular, the memory reservation preferably is large enough to contain the launch kernel, concurrent system applications, and drivers. The CPU reservations preferably constant, such that if the reserve CPU usage is not returned by the system applications, and idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size, and the overlay may preferably scales with screen resolution. Where a full user interface used by the concurrent system application, the resolution may be independent of application resolution. A scaler may be used to set this resolution, such that the need to change frequency and cause ATV re-sync is eliminated.

After the multimedia console 800 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications may be scheduled to run on the CPU 801 at predetermined times and intervals in order to provide a consistent system resource view to the application. The scheduling is to minimize cache disruption for the game application running on the multimedia console 800.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 842 and 854) are shared by gaming applications and system applications. In the illustrated implementation, the input devices are not reserved resources but are to be switched between system applications and gaming applications such that each will have a focus of the device. The application manager preferably controls the switching of input stream, and a driver maintains state information regarding focus switches. Cameras and other capture devices may define additional input devices for the multimedia console 800.

As previously discussed, while a node device may perform at least some aspects of the self-locating functionality, it should be understood that all or a portion of the self-locating computations may be performed by the multimedia console 800.

Figure 9:
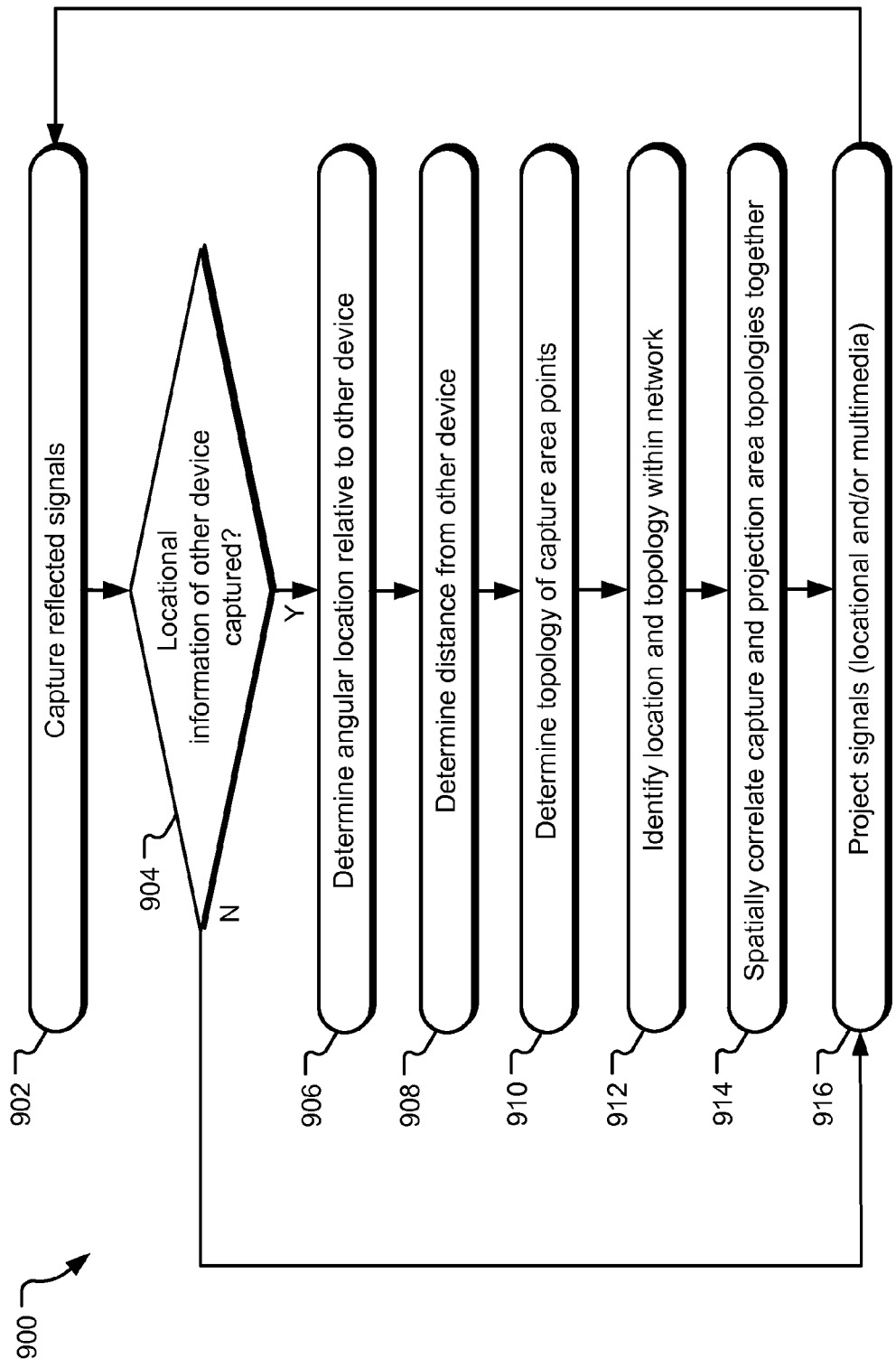
FIG. 9 illustrate example operations for self-locating a node device.

FIG. 9 illustrate example operations 900 for self-locating a node device. A capturing operation 902 captures reflected signals from a multimedia environment. Some captured signals may include locational information from other node devices, (e.g., from signals projected by another node device, etc.), ambient light and sound, skeletal information about a user within the capture area, gesture information made by a user, etc. If no locational information from another node device is captured, a decision operation 904 directs processing to a projecting operation 916, which projects location information and/or multimedia, such as a virtual game board, a virtual environment, etc.

If locational information from another node device is captured, the decision operation 904 directs processing to an angular location operation 906, which determines the angle of the capturing node device relative to the other (projecting) node device based on an angularly unique pattern or other information projected by the other node device. For example, if each node device assumes an angular coordinate system, and a projecting node device projects locational information with reference to its angular coordinate system, then a capturing node device can capture a portion of the projected locational information and a locating engine can determine the angle of the capturing node relative to the projecting node.

A distance operation 908 determines the distance of the capturing node relative to the other projecting node based on the locational information projected by the projecting node. For example, a projecting node projects locational information, then a capturing node can capture a portion of the projected locational information and a locating engine can determine based on the amount of overlap how close the nodes are to each other.

A topology operation 910 determines the depth the capture surface from the capturing node based on the depth information. The depth information for individual points in a capture area can be computed, for example, based on structured light projected by the capturing node, stereoscopic effects information from multiple cameras in the capturing node, discerned deformation of a pattern projected by the capturing node on an irregular capture surface. For example, a projection device in the node projects structured light into a projection area and a capture device in the node captures the light reflected from the projection area to determine the depth of multiple points in the capture area. On the basis of the depth information, the topology of the capture area, as well as skeletal and gesture information from the capture area, can be determined by the node.

A spatial correlation operation 914 combines the relative angular, distance, and topology information to map out the capture areas of two or more node devices in the multimedia network and to integrate projection areas so that images in each projection area are aligned. The spatial correlation operation 914 can be performed by a node, by a console, by a third-party service, etc.

A projection operation 916 projects locational and/or multimedia signals into a projection area. The locational signals can include locational information (e.g., patterns, structured light, coordinates, etc.) that can be used by other nodes to determine their relative locations to the node that projects in the projection operation 916. The multimedia signals may provide an aspect of the multimedia environment (e.g., a gaming environment). The locational signals may be projected at distinct periods from the multimedia signals, such as during a locating operational mode as compared to during a multimedia operational mode. Alternatively, the locational signals and the multimedia signals may be projected concurrently (e.g., with locational information in the invisible spectrum and the multimedia signals in the visible spectrum) or in a time slot multiplexing fashion, wherein the multiplexing cycles fast enough that it is not noticeable to the human users but is discernable to the node devices in the network.

Figure 10:
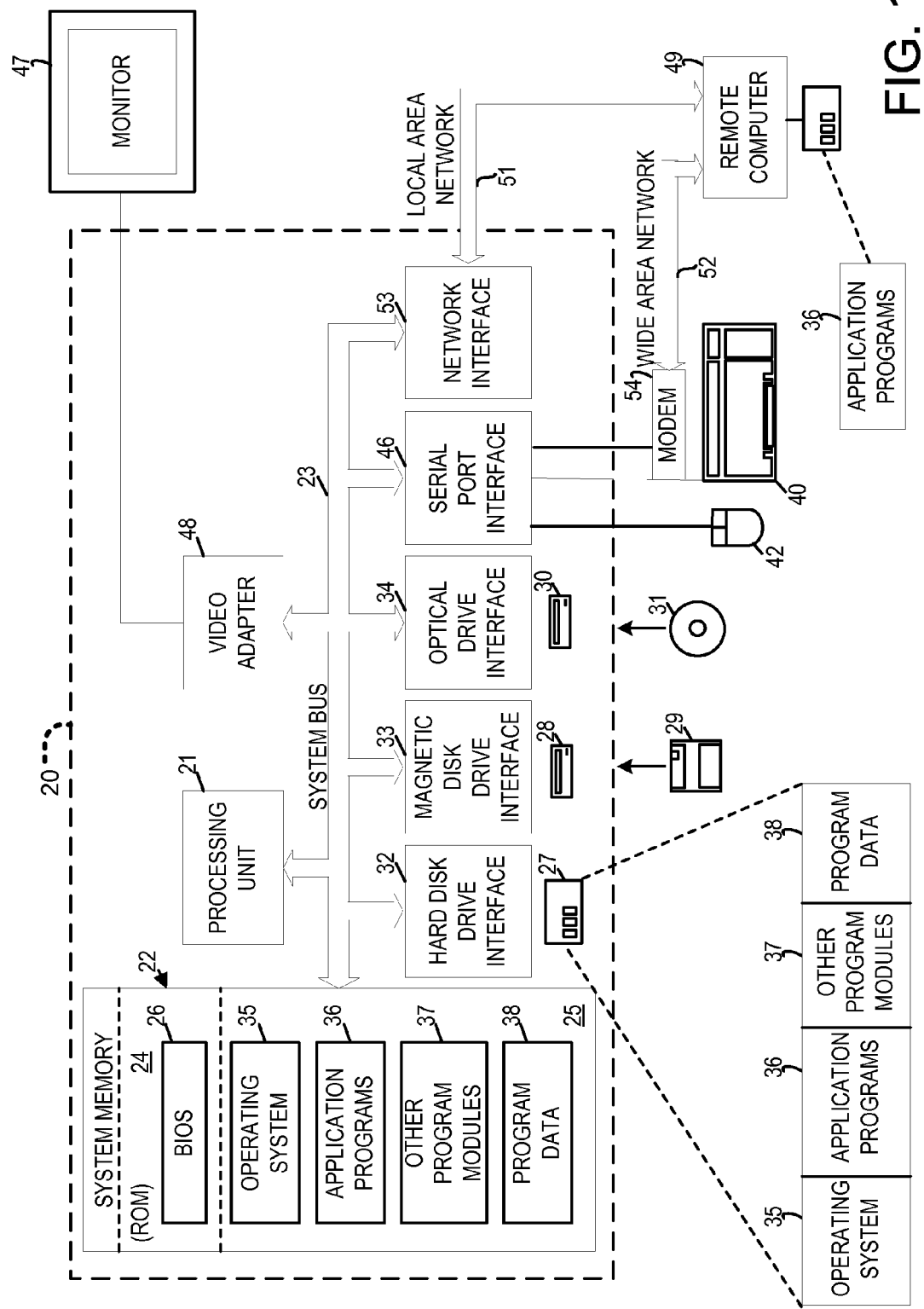
FIG. 10 illustrates an example system that may be useful in implementing the technology described herein.

FIG. 10 illustrates an example system that may be useful in implementing the described technology. The example hardware and operating environment of FIG. 10 for implementing the described technology includes a computing device, such as general purpose computing device in the form of a gaming console, multimedia console, or computer 20, a mobile telephone, a personal data assistant (PDA), a set top box, or other type of computing device. In the implementation of FIG. 10, for example, the computer 20 includes a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program engines and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program engines may be stored on the hard disk, magnetic disk 29, optical disk 31, ROM 24, or RAM 25, including an operating system 35, one or more application programs 36, other program engines 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 10. The logical connections depicted in FIG. 10 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are example and other means of and communications devices for establishing a communications link between the computers may be used.

In an example implementation, a locating engine, a gestures recognition engine, a stitching engine, and other engines and services may be embodied by instructions stored in memory 22 and/or storage devices 29 or 31 and processed by the processing unit 21. Locational signals, coordinates, multimedia signals, virtual environment data, multimedia content, topologies, depth information, and other data may be stored in memory 22 and/or storage devices 29 or 31 as persistent datastores. Further, a stitching service can represent hardware and/or software configured to provide service functionality for network-connected systems. Such services may be implemented using a general-purpose computer and specialized software (such as a server executing service software), a special purpose computing system and specialized software (such as a mobile device or network appliance executing service software), or other computing configurations.

The embodiments of the invention described herein are implemented as logical steps in one or more computer systems. The logical operations of the present invention are implemented (1) as a sequence of processor-implemented steps executing in one or more computer systems and (2) as interconnected machine or circuit engines within one or more computer systems. The implementation is a matter of choice, dependent on the performance requirements of the computer system implementing the invention. Accordingly, the logical operations making up the embodiments of the invention described herein are referred to variously as operations, steps, objects, or engines. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method comprising:
    capturing, by a first node device, locational signals projected by a second node device, wherein the locational signals are captured by the first node device from a capture area and projected by the second node device into a projection area bordered by an arc and having an overlapping region with the capture area, wherein both the capture area and the projection area extend beyond the overlapping region;
    analyzing the locational signals within the overlapping region to determine a portion of the arc of the projection area that is included within the overlapping region;

using the determined portion of the arc of the projection area within the overlapping region to determine an angular relationship between the first node device and the second node device and a relative distance between the first node device and the second node device; and using the angular relationship and the relative distance to determine a location of the first node device relative to the second node device.

2. The method of claim 1 wherein the locational signals include structured light.

3. The method of claim 1 wherein the locational signals include angularly unique signals projected into the overlapping region by the second node device.

4. The method of claim 1 wherein the locational signals include coordinates.

5. The method of claim 1 further comprising:
determining depth information about points in the overlapping region, the depth information defining respective distances between the first node device and the points in the overlapping region.

6. The method of claim 5 wherein the depth information defines an irregular topology for the overlapping region.

7. The method of claim 5 wherein the depth information defines a first topology of the overlapping region, and further comprising:
combining the first topology with a second topology of the overlapping region to form a combined topology of a portion of a virtual environment, wherein the second topology is determined from second locational signals captured by the second node device.

8. A first node device comprising:
a capture device configured to capture locational signals projected by a second node device into a capture area of the capture device; and
control logic configured to:
determine a part of a shape of a projection area of the second node device that coincides with the capture area of the first node device,
determine a location of the first node device relative to the second node device based on the captured locational signals and the determined part of the shape of the projection area,
determining depth information about points in the capture area based on the captured locational signals and the determined part of the shape of the projection area, the depth information defining respective distances between the first node device and the points in the capture area, wherein the depth information defines an irregular topology of the capture area, and
cause the first node device to perform projection of visual aspects of a virtual environment and adjust the projection of the visual aspects to account for the irregular topology.

9. The first node device of claim 8 wherein the control logic is further configured to determine the location by:
determining an angular relationship between the first node device and the second node device based on the captured locational signals; and
determining the location based on the angular relationship.

10. The first node device of claim 8 wherein the control logic further configured to determine the location by:
determining a relative distance between the first node device and the second node device based on the captured locational signals; and
determining the location based on the relative distance.

11. The first node device of claim 8 wherein the shape of the projection area is an ellipse and the determined part of the shape of the projection area is bounded by a section of the ellipse and another section of the capture area, the section of the ellipse being an arc.

12. The first node device of claim 8 wherein the control logic is further configured to:
capture movement as part of a multimedia experience; and
cause the first node device to further adjust the projection of the visual aspects based on the captured movement.

13. The first node device of claim 8 wherein the control logic is further configured to:
capture sound as part of a multimedia experience,
cause the first node device to further adjust the projection of the visual aspects based on the captured sound.

14. The first node device of claim 8 wherein the control logic is further configured to:
combine the irregular topology of the capture area of the first node device with a second topology of a second capture area of the second node device to form a combined topology of a portion of the virtual environment.

15. A first node device comprising:
a capture device configured to capture locational signals projected by a second node device into a capture area of the capture device; and
a processor and memory, the memory storing processor-readable instructions that, when executed by the processor, cause the processor to:
determine a part of a shape of a projection area of the second node device that coincides with the capture area of the first node device,
determine a location of the first node device relative to the second node device based on the captured locational signals and the
determined part of the shape of the projection area, determine depth information about points in the capture area based on the captured locational signals and the determined part of the shape of the projection area, the depth information defining respective distances between the first node device and the points in the capture area, wherein the depth information defines an irregular topology of the capture area, and
cause the first node device to perform projection of visual aspects of a virtual environment and adjust the projection of the visual aspects to account for the irregular topology.

16. The first node device of claim 15, further comprising a housing configured to screw into a standard light bulb fixture.

17. The first node device of claim 16, wherein the capture device is disposed within the housing.

18. The first node device of claim 16, further comprising:
a projection device disposed within the housing, the projection device configured to project other locational signals into at least a portion of another capture area of a third node device.

19. The first node device of claim 15, wherein the first node device is configured to operate in multiple modes, the multiple modes comprising two or more of:
visible light projection,
invisible light projection,
sound projection,
visible light capture,
invisible light capture, and
sound capture.

20. The first node device of claim 15, wherein the first node device is a component of a system that also includes the second node device.

\* \* \* \* \*